United States Patent [19]
Kuo

[11] Patent Number: 5,463,331
[45] Date of Patent: Oct. 31, 1995

[54] PROGRAMMABLE SLEW RATE CMOS BUFFER AND TRANSMISSION LINE DRIVER WITH TEMPERATURE COMPENSATION

[75] Inventor: James R. Kuo, Cupertino, Calif.

[73] Assignee: National Semiconductor Corporation, Santa Clara, Calif.

[21] Appl. No.: 384,358

[22] Filed: Feb. 2, 1995

Related U.S. Application Data

[63] Continuation of Ser. No. 73,679, Jun. 8, 1993, abandoned.

[51] Int. Cl.[6] ............................................. H03K 19/0185
[52] U.S. Cl. .................... 326/86; 326/32; 326/87; 327/170
[58] Field of Search ................................ 307/443, 451, 307/475, 310, 263, 296.5, 481; 375/36, 60; 326/32, 83, 86, 87; 327/170

[56] References Cited

U.S. PATENT DOCUMENTS

| | | | |
|---|---|---|---|
| 3,333,113 | 7/1967 | Cole et al. | 307/88.5 |
| 3,899,754 | 8/1975 | Brolin . | |
| 4,254,501 | 3/1981 | Griffith et al. | 375/9 |
| 4,385,394 | 5/1983 | Pace | 375/36 |
| 4,393,494 | 7/1983 | Belforte et al. | 370/27 |
| 4,419,594 | 12/1983 | Gemmell et al. . | |
| 4,645,948 | 2/1987 | Morris et al. . | |
| 4,647,912 | 3/1987 | Bates et al. | 340/825.5 |

(List continued on next page.)

FOREIGN PATENT DOCUMENTS

| | | | |
|---|---|---|---|
| 0199374 | 10/1986 | European Pat. Off. | H03K 19/094 |
| 0351820A2 | 1/1990 | European Pat. Off. | H03K 19/017 |
| 0504983A1 | 9/1992 | European Pat. Off. | G05F 3/24 |
| 0557080A1 | 8/1993 | European Pat. Off. | H03K 19/003 |
| 0575676A1 | 12/1993 | European Pat. Off. | H03K 19/00 |
| WO85/02507 | 6/1985 | WIPO | H03K 19/092 |
| WO85/04774 | 10/1985 | WIPO | H03K 19/086 |
| WO86/01055 | 2/1986 | WIPO | H03K 19/092 |
| WO89/00362 | 1/1989 | WIPO | H03K 19/094 |
| WO91/20129 | 12/1991 | WIPO | H03K 19/003J4 |

OTHER PUBLICATIONS

P. E. Allen and D. R. Holberg, "Analog CMOS Subcircuits 5.5 Current and Voltage References," *CMOS Analog Circuit Design*, Holt, Rinehart and Winston, The Dryden Press, pp. 240–251 (1987).
Bill Gunning, "GTL Fact Sheet", Sep. 20, 1991, all pages.
Paul R. Gray and Robert G. Meyer, "Analysis and Design of Analog Integrated Circuits", 1977, pp. 254–261.
"Electronically Switchable Interface Circuit With Multiple EIA Protocol Drivers and Receivers", IBM Technical Disclosure Bulletin, vol. 30, No. 11, Apr. 1988, all pages.

(List continued on next page.)

*Primary Examiner*—Edward P. Westin
*Assistant Examiner*—Benjamin D. Driscoll
*Attorney, Agent, or Firm*—Limbach & Limbach

[57] ABSTRACT

A driver for providing binary signals from a data system to a transmission line is disclosed. The driver includes a first field-effect transistor (FET) coupled between an output node and ground for conducting current from the output node to ground. The output node is connectable to the transmission line. An initial charging stage provides an initial charging current to the gate of the first FET for a period of time not to exceed an initial charging time period. The initial charging time period has a length approximately equal to a period of time necessary to increase the gate voltage of the first FET from ground to the threshold voltage of the first FET. A main charging stage provides a main charging current to the gate of the first FET for a period of time not to exceed a main charging time period. A discharging stage provides a discharging current from the gate of the first FET to ground. Finally, a temperature compensation circuit is coupled to the initial charging stage, the main charging stage, and the discharging stage for adjusting the level of the initial charging current, the main charging current, and the discharging current to compensate for variations in temperature and for controlling the length of the main charging time period.

24 Claims, 10 Drawing Sheets

U.S. PATENT DOCUMENTS

| | | | |
|---|---|---|---|
| 4,723,108 | 2/1988 | Murphy et al. | 323/315 |
| 4,751,404 | 6/1988 | Yuen | 326/136 |
| 4,760,292 | 7/1988 | Bach | 326/30 |
| 4,763,021 | 8/1988 | Stickel . | |
| 4,774,422 | 9/1988 | Donaldson et al. . | |
| 4,825,402 | 4/1989 | Jalali | 364/900 |
| 4,855,622 | 8/1989 | Johnson | 326/19 |
| 4,855,623 | 8/1989 | Flaherty . | |
| 4,894,561 | 1/1990 | Nogami | 307/443 |
| 4,922,140 | 5/1990 | Gahle et al. . | |
| 4,929,941 | 5/1990 | Lecocq | 340/825.14 |
| 4,972,106 | 11/1990 | Ruijs | 326/30 |
| 4,978,905 | 12/1990 | Hoff et al. | 323/314 |
| 4,980,579 | 12/1990 | McDonald et al. | 326/21 |
| 5,015,888 | 5/1991 | Ovens | 326/18 |
| 5,017,813 | 5/1991 | Galbraith et al. | 326/16 |
| 5,019,728 | 5/1991 | Sanwo et al. | 326/30 |
| 5,021,684 | 6/1991 | Ahuja et al. | 307/443 |
| 5,021,691 | 6/1991 | Saito . | |
| 5,023,487 | 6/1991 | Wellheuser et al. | 326/56 |
| 5,023,488 | 6/1991 | Gunning | 326/30 |
| 5,034,632 | 7/1991 | Jansson et al. | 326/19 |
| 5,041,743 | 8/1991 | Matsumoto | 326/18 |
| 5,070,256 | 12/1991 | Grondalski . | |
| 5,079,456 | 1/1992 | Kotowski et al. . | |
| 5,081,380 | 1/1992 | Chen . | |
| 5,095,231 | 3/1992 | Sartori et al. . | |
| 5,117,130 | 5/1992 | Shoji . | |
| 5,118,971 | 6/1992 | Schenck . | |
| 5,165,046 | 11/1992 | Hesson . | |
| 5,198,701 | 3/1993 | Davies et al. . | |
| 5,200,654 | 4/1993 | Archer . | |
| 5,208,492 | 5/1993 | Masumoto et al. | 307/443 |
| 5,216,292 | 6/1993 | Imazu et al. . | |
| 5,218,239 | 6/1993 | Boomer | 307/263 |
| 5,231,315 | 6/1993 | Thelen, Jr. . | |
| 5,241,221 | 8/1993 | Fletcher et al. . | |
| 5,254,883 | 10/1993 | Horowitz et al. . | |
| 5,285,116 | 2/1994 | Thaik | 307/443 |
| 5,287,386 | 2/1994 | Wade et al. . | |
| 5,291,071 | 3/1994 | Allen et al. . | |
| 5,293,082 | 3/1994 | Bathaee . | |
| 5,296,756 | 3/1994 | Patel et al. . | |
| 5,304,861 | 4/1994 | Fruhauf et al. . | |
| 5,313,118 | 5/1994 | Lundberg . | |
| 5,315,174 | 5/1994 | Chang et al. | 307/443 |
| 5,319,258 | 6/1994 | Ruetz | 307/443 |
| 5,329,184 | 7/1994 | Redfern . | |
| 5,334,882 | 8/1994 | Ting . | |
| 5,338,987 | 8/1994 | Tomasetti et al. . | |

OTHER PUBLICATIONS

Boris Bertolucci, "Fastbus Dual–Port Memory and Display Diagnostic Module", IEEE Transactions on Nuclear Science, vol. NS–34, No. 1, Feb. 1987, pp. 253–257.

National Semiconductor Corporation, "DS36950 Quad Differential Bus Transceiver", Interface Databook, 1990 Edition, pp. 1–123 to 1–131.

National Semiconductor Corporation, "DS3886 BTL 9–Bit Latching Data Transceiver", High Performance Bus Interface Designer's Guide, 1991 Edition, pp. 1–74 to 1–80.

National Semiconductor Corporation, "DS3883 BTL 9–Bit Data Transceiver", High Performance Bus Interface Designer's Guide, 1991, Edition, pp. 1–58 to 1–62.

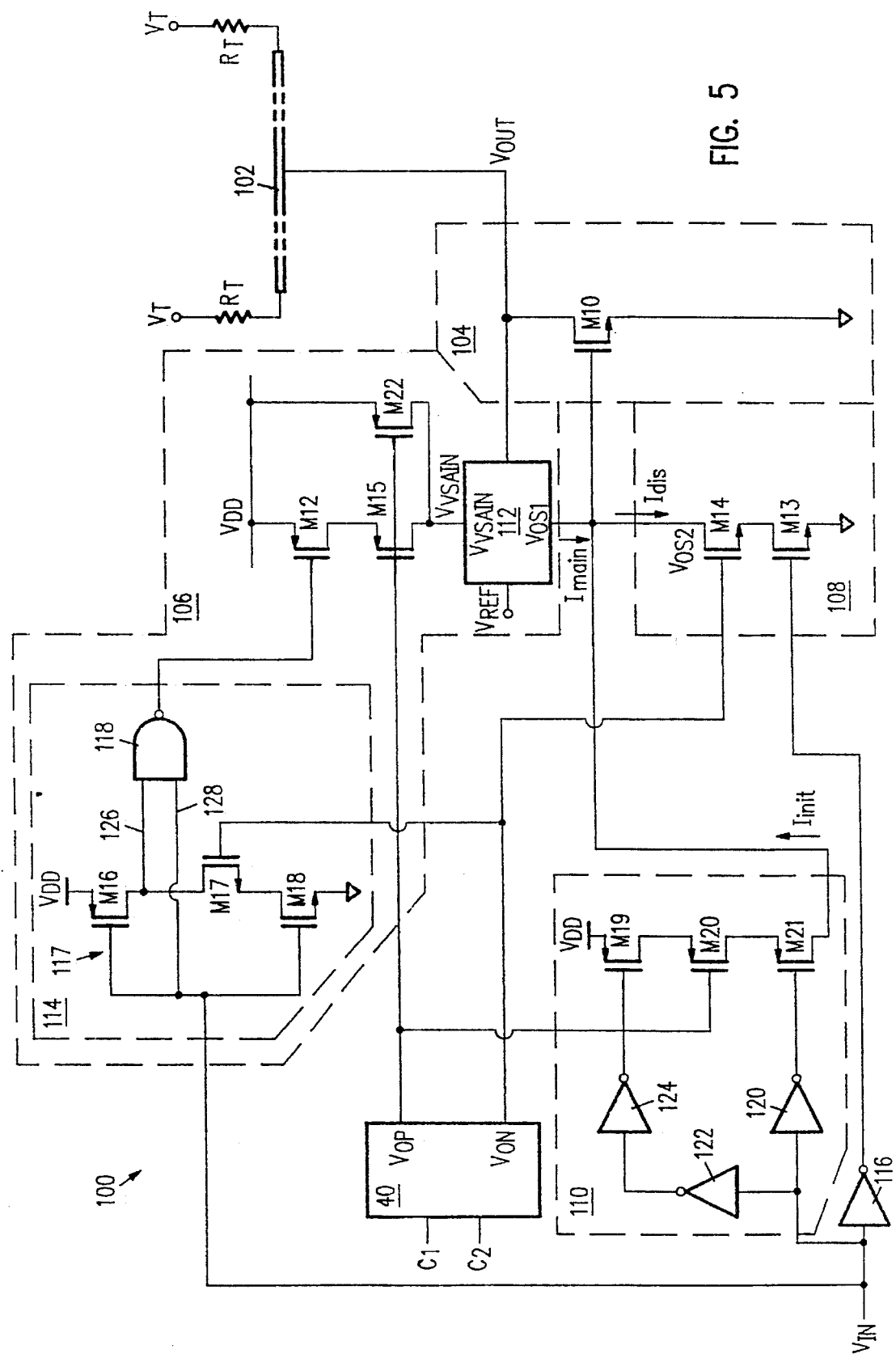

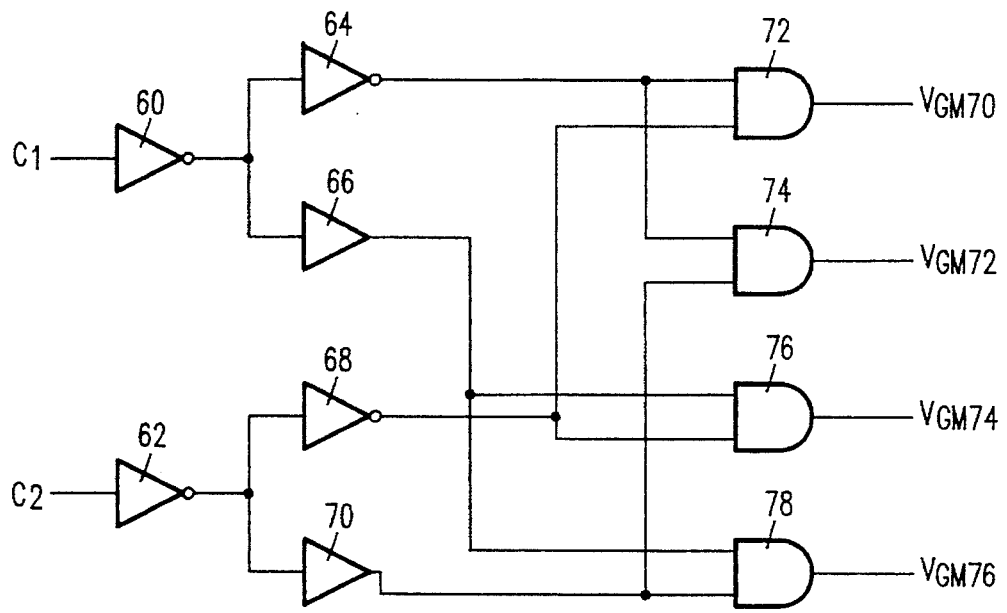
FIG. 9A
| C1 | C2 | VGM70 | VGM72 | VGM74 | VGM76 |
|----|----|-------|-------|-------|-------|
| 0  | 0  | 0     | 0     | 0     | 1     |
| 0  | 1  | 0     | 0     | 1     | 0     |
| 1  | 0  | 0     | 1     | 0     | 0     |
| 1  | 1  | 1     | 0     | 0     | 0     |
FIG. 9B
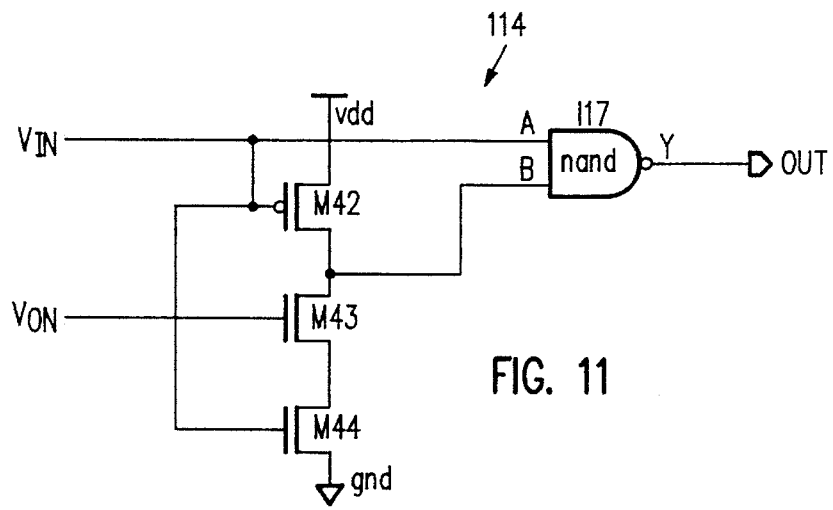
FIG. 11

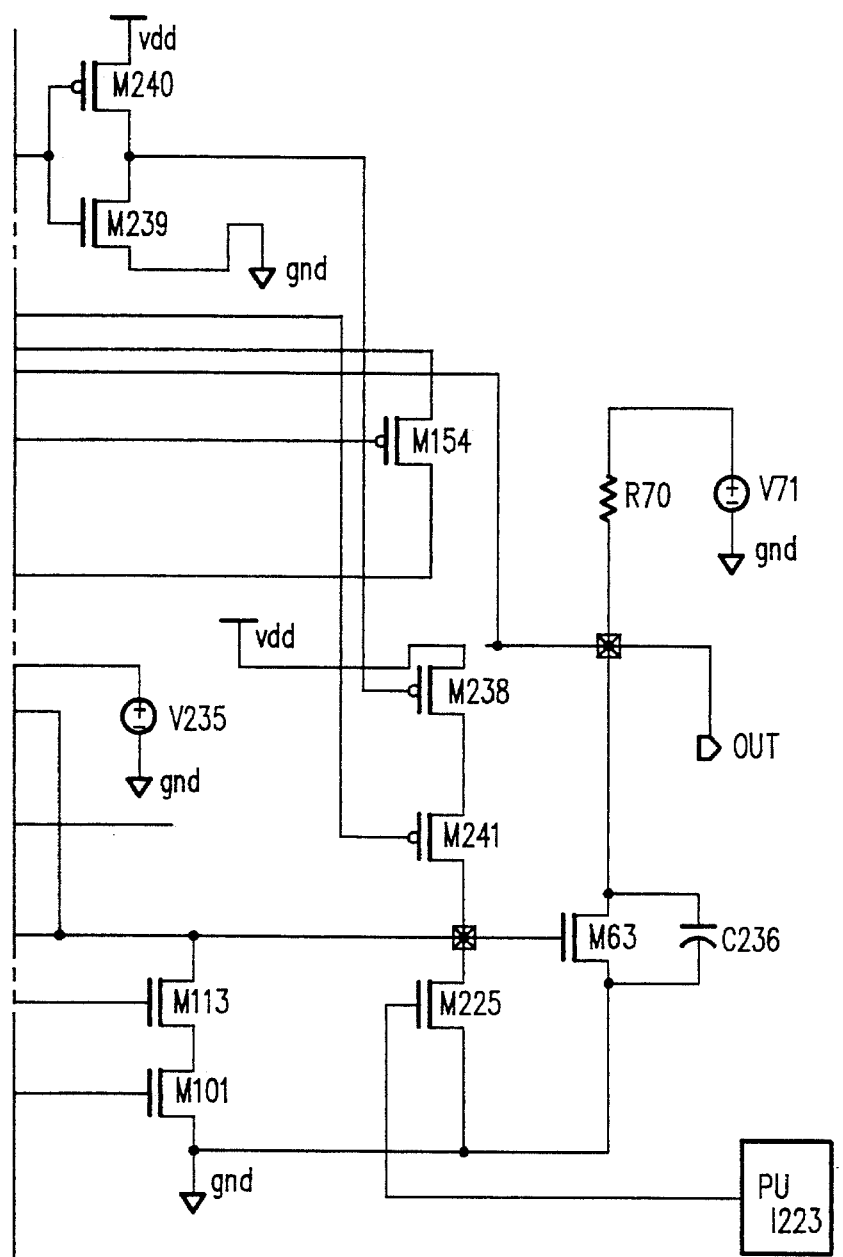
FIG. 10C
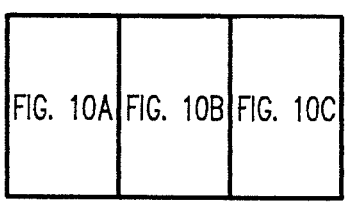
KEY TO FIG. 10

PROGRAMMABLE SLEW RATE CMOS BUFFER AND TRANSMISSION LINE DRIVER WITH TEMPERATURE COMPENSATION

This is a continuation of application Ser. No. 08/073,679, filed on Jun. 8, 1993, now abandoned.

RELATED APPLICATIONS

This application is related to the following copending applications that were all filed of even date herewith and are commonly assigned with this application to National Semiconductor Corporation of Santa Clara, Calif.: U.S. Ser. No. 08/073,939, titled "Programmable CMOS Current Source Having Positive Temperature Coefficient" by James Kuo; U.S. Ser. No. 08/073,534, titled "CMOS BTL Compatible Bus And Transmission Line Driver" by James Kuo; U.S. Ser. No. 08/073,304, titled "CMOS Bus And Transmission Line Driver Having Compensated Edge Rate Control" by James Kuo; and, U.S. Ser. No. 08/073,927, titled "Programmable CMOS Bus And Transmission Line Receiver" by James Kuo. The above-referenced applications are hereby incorporated by reference to provide background information regarding the present invention.

BACKGROUND OF THE INVENTION

1. Field of the Invention

The present invention relates to line interface devices, and, in particular, to a CMOS driver having a programmable output voltage swing and programmable edge rate control that may be used for interfacing CMOS digital circuits to transmission lines.

2. Description of the Related Art

Digital systems typically include several Very Large Scale Integrated (VLSI) circuits that cooperate and communicate with one-another to perform a desired task. FIG. 1 illustrates a typical digital system. The VLSI circuits are mounted on several circuit boards that are referred to as "daughter boards". Each daughter board may accommodate several VLSI circuits. In turn, the daughter boards are received by a "mother board" that has circuitry for facilitating communication between the individual daughter boards.

The individual VLSI circuits are interconnected for binary communication by transmission mediums. The transmission mediums are generally collected together to form buses. The number, size and types of buses that are used in a digital system may be designed for general-purpose applications or according to a more specific, industry standard data-communications configuration. One such industry standard is the so-called IEEE 896.1 Futurebus+ standard. The Futurebus+ standard provides a protocol for implementing an internal computer bus architecture.

FIG. 1 illustrates the hierarchy of the several different bus levels utilizable in a Futurebus+ system. A "component level bus" is used to interconnect the several VLSI circuits that are located on a single daughter board, and a "backplane bus" is used to interconnect the VLSI circuits of one daughter board to the VLSI circuits of another daughter board. Thus, a component level bus is constructed on each daughter board, and a backplane bus is constructed on the mother board.

The transmission mediums which form the component and backplane buses are typically traces which are formed on the printed circuit board (PCB) substrates of the daughter and mother boards. Microstrip traces and strip line traces can be employed to form transmission lines having characteristic impedances on the order of about 50Ω–70Ω. Such transmission lines usually have their opposite ends terminated in their characteristic impedance. Because of these parallel resistive terminations, the effective resistance of the transmission line may be as low as 25Ω–35Ω.

Data transceivers (TRANSmitter/reCEIVER) are used to interface the VLSI circuits to the transmission medium. FIG. 2 illustrates the positioning of a data transceiver between the backplane bus of a Futurebus+ system and the data bus of a VLSI circuit to facilitate communications between the VLSI circuit and the rest of the digital system.

A data transceiver is a read/write terminal capable of transmitting information to and receiving information from the transmission medium. A transceiver typically includes a line driver stage (or simply "driver") and a receiver stage (or simply "receiver"). The common purpose of transmission line drivers and receivers is to transmit data quickly and reliably through a variety of environments over electrically long distances. This task is complicated by the fact that externally introduced noise and ground shifts can severely degrade the data.

Drivers amplify digital signal outputs from the VLSI circuitry so that the signals can be properly transmitted on the transmission medium. Receivers are typically differential amplifiers that receive signals from the transmission medium and provide outputs to the VLSI circuitry that are representative of digital information received from the medium.

Conventional drivers usually include level shifting capability to provide compatibility with different integrated circuit technologies. Specifically, before a driver transmits a signal across a transmission medium, the driver changes the nominal voltage swing (or the "dynamic signal range") utilized by the VLSI circuitry, e.g., CMOS, TTL, ECL, etc., to a different voltage swing that is utilized by the transmission medium. Thus, a driver not only amplifies a digital signal, but it changes the nominal voltage swing of the signal as well.

A different nominal voltage swing is normally used when transmitting data across a transmission medium in order to conserve power. Specifically, the power internally dissipated by the driver is proportional to the nominal voltage swing of the binary signal it applies to the transmission line. Therefore, power dissipation is reduced if the driver transmits a signal having a relatively small voltage swing over the transmission line.

It has become common for signals to be transmitted over transmission lines at BTL (Backplane Transceiver Logic) signal levels. The signal level standard is denoted "Backplane" because BTL has been used primarily in the backplane buses of mother boards. Because the nominal voltage swing of BTL is 1.0 Volt (logic low) to 2.1 Volts (logic high), power dissipation is less than it would be if the signals were transmitted over the transmission lines at CMOS (0 Volts to 3.3 Volts, or, 0 Volts to 5.0 Volts) or TTL (0 Volts to 3.5 Volts) signal levels.

FIG. 3 illustrates a conventional BTL driver 20. The driver 20 receives CMOS level signals at input $V_{IN}$ and outputs BTL level signals to a terminated transmission line 22 at output $V_{OUT}$. The driver 20 is implemented with bipolar transistors Q1, Q2, Q3, Q4, and Q5. Bipolar technology is attractive for implementing I/O devices, such as line or bus drivers, because of its unique high current gain characteristic. High current gain is important in a bus system such as future bus backplane because the driver 20 must be capable of driving the transmission line in both unloaded and loaded conditions. The bipolar NPN transistor Q1 is particularly suited to be the driving device of the BTL driver 20.

Although the BTL driver 20 is capable of generating the current required to drive a backplane bus, it suffers from a number of disadvantages due to its bipolar construction.

First, because of the large collector capacitance of transistor Q1, a blocking schottky diode D1 is required in order to reduce the driver 20 output capacitance to less than 2.0 pF.

Second, the driver 20 output $V_{OUT}$ has a very fast rising and falling edge. Without control, the fast rising and falling edge can create ground bouncing, output over/under shoot, and cross-talk between bus conductors. These adverse effects can significantly reduce a receiver's noise margin. In order to control the adverse effects that can be caused by a fast rising and falling edge, Futurebus+ specifies a minimum rise-time $t_r$ and fall-time $t_f$ 1 nano-second measured between 20% to 80% of the voltage swing levels.

In order to meet the Futurebus+ specifications with respect to $t_r$ and $t_f$, the BTL driver 20 uses a miller capacitor $C_M$ between the collector of transistor Q1 and the base of transistor Q2 to increase $t_f$. Specifically, $t_f$ is given by:

$$t_f = \frac{C_M}{I_{bQ2}} \Delta V_{OUT},$$

where $I_{bQ2}$ is the base current of transistor Q2. Similarly, the BTL driver 20 uses the capacitance $C_{ob}$ at the collector-base junction of transistor Q1 to control $t_r$. Specifically, $t_r$ is given by:

$$t_r = \frac{C_{ob}}{I_{bQ1}} \Delta V_{OUT},$$

where $I_{bQ1}$ is the base current of transistor Q1. The problem with controlling $t_f$ and $t_r$ in this manner, however, is that both $I_{bQ2}$ and $I_{bQ1}$ are supply voltage $V_{DD}$ and temperature dependant. When temperature decreases and the supply voltage $V_{DD}$ increases, $I_{bQ2}$ and $I_{bQ1}$ both increase which results in a decrease in $t_r$ and $t_f$. Thus, the $t_r$ and $t_f$ of the BTL driver 20 are difficult to control during variations in temperature and supply voltage $V_{DD}$. If not controlled, $t_r$ and $t_f$ could fall below the Futurebus+ minimum specifications.

Another disadvantage of the bipolar BTL driver 20 is the skew between its turn-on and turn-off delay. When temperature increases and supply voltage increases, the increase in the base turn-on current $I_{bQ1ON}$ and current gain of transistor Q1 significantly increases transistor Q1's base over-drive. An increase in temperature of 100° C. can increase the base turn-on current $I_{bQ1ON}$ and current gain of transistor Q1 by 100%. Such an increase in transistor Q1's base over-drive causes $t_r$, and thus, turn-on time, to get much shorter.

However, the increase in the base turn-on current $I_{bQ1ON}$ of transistor Q1 due to the temperature and supply voltage increases causes more storage charge to accumulate in transistor Q1's collector and base region. The accumulation of storage charge causes the base turn-off current $I_{bQ1OFF}$ ($V_{BEQ1}/R1$) of transistor Q1 to decrease, and the decrease in $I_{bQ1OFF}$ causes $t_f$ and the turn-off time of transistor Q1 to be very long. Therefore, the skew between the turn-on and turn-off times tends to get worse as temperature and supply voltage increase.

Other disadvantages of the BTL driver 20 due to its bipolar implementation are high power dissipation and the inefficiency of large scale integration due to lower gate density and higher cost. These disadvantages would also be present in a BiCMOS implementation.

Signals have also been transmitted over transmission lines at the so-called "GTL" signal levels disclosed in U.S. Pat. No. 5,023,488 to Gunning ("Gunning"). Gunning discloses such GTL drivers and receivers for interfacing VLSI CMOS circuits to transmission lines. The nominal voltage swing of GTL is approximately 0.3 Volts (logic low) to 1.2 Volts (logic high).

FIG. 4 shows a GTL driver 30 that is disclosed in Gunning. A very wide channel, open drain, N-channel CMOS transistor M1 is used for transforming binary signals to a transmission line 32 from a more or less conventional CMOS signal source 34 which effectively isolates the transmission line 32 from the ordinary 5 v rail-to-rail signal swing of the signal source 34. Transistor M1 has its gate connected to the output of the signal source 34, its drain connected to the transmission line 32, and its source returned to ground (i.e., the same reference level as the 0 v rail of the signal source 34). The channel width of the transistor M1 is orders of magnitude greater than its channel length to reduce the effective resistance of its source-drain circuit in conduction.

In operation, when the signal at $V_{IN}$ drops to a low ("0") logic level, transistors M2 and M3 are switched into and out of conduction, respectively. Thus, the gate capacitance of transistor M1 is charged relatively rapidly by the current conducted by the source-drain circuit of transistor M2. The gate of transistor M1 is quickly pulled up toward the 5 Volt rail of the signal source 14, thereby causing transistor M1 to promptly switch into conduction. On the other hand, when the signal $V_{IN}$ increases to a high ("1") logic level, transistor M2 switches out of conduction while transistor M3 switches into conduction. This causes the gate capacitance of transistor M1 to be quickly discharged by the current conducted by the source-drain circuit of transistor M3 so that the gate of transistor M1 is pulled down relatively rapidly toward the 0 Volt rail of the signal source 14, thereby promptly switching transistor M1 out of conduction.

The signal level on the transmission line 32 tends to stabilize substantially at the voltage level to which the transmission line 32 is terminated a short time after transistor M1 is switched out of conduction (i.e., as soon as the switching transients have settled out). On the other hand, when transistor M1 is switched into conduction, its source-drain circuit provides a ground return path for current flow through the parallel terminating resistors indicated by 36. The signal level at which the transmission line 32 tends to stabilize (again, after the switching transients have settled out) is determined by the voltage division which the parallel terminating resistor 36 and the source-drain resistance of the conductive transistor M1 perform on the voltage to which the transmission line 32 is terminated.

Provision is made in the driver 30 for damping certain of the switching transients which are generated when transistor M1 is switched into and out of conduction. Some of the more troublesome switching transients occur when transistor M1 is switched from a conductive state to a non-conductive state. The drain-side parasitic packaging inductance and the drain-side parasitic capacitances of transistor M1 form a ringing circuit which tends to cause the voltage on the transmission line 32 to overshoot its nominal upper limit by a substantial margin and to oscillate for a prolonged period of time. Similarly, the source-side parasitic inductances and capacitances of transistor M1 form another ringing circuit which tends to cause a potentially troublesome oscillatory "ground bounce" perturbance of the reference voltage on the low level rail of the CMOS circuit.

To reduce these switching transients, the driver 30 is equipped with a feedback circuit for briefly connecting the drain of transistor M1 to its gate when transistor M1 is switched from a conductive state to a non-conductive state. The feedback circuit includes a pair of n-channel transistors M4 and M5 which have their source-drain circuits connected in series between the drain and gate of transistor M1. The input $V_{IN}$ for the driver 30 is coupled to the gate of transistor M5, and two additional inverter stages 37 and 38 are coupled between the inverter 34 and the gate of transistor M4.

The GTL driver 30 disclosed in Gunning suffers from a number of disadvantages which cause output pulse distortion. First, the feedback circuit that is used to control the rising edge of $V_{OUT}$ prevents the drain voltage of transistor M1 from increasing to a level significantly above its gate voltage. Because the drain voltage is held low, $V_{OUT}$ cannot go high until the feedback circuit is disabled which increases the propagation delay of the driver 30.

A second disadvantage of the driver 30 is that its rise time $t_r$, fall time $t_f$, edge rate, turn-on delay, turn-off delay, and propagation delay are sensitive to temperature variations, supply voltage $V_{CC}$ variations, and process variations.

A third disadvantage of the driver 30 is that its minimum rise time $t_r$ and fall time $t_f$ are too fast which causes ground bouncing, output over-shooting, and large cross-talk.

Thus, there is a need for a BTL driver that overcomes the disadvantages of the conventional bipolar BTL driver discussed above, and there is a need for a transmission line driver that provides an output voltage swing of approximately 0.3 Volts (logic low) to 1.2 Volts (logic high) and that overcomes the disadvantages of the GTL driver discussed above.

SUMMARY OF THE INVENTION

The present invention provides a driver for providing binary signals from a data system to a transmission line. The driver includes a first field-effect transistor (FET) coupled between an output node and ground for conducting current from the output node to ground. The output node is connectable to the transmission line. A main charging stage provides a main charging current to the gate of the first FET for a period of time not to exceed a main charging time period. A discharging stage provides a discharge current from the gate of the first FET to ground. Programming circuitry is used for programming the length of the main charging time period.

In another embodiment of the present invention, a driver is provided for providing binary signals from a data system to a transmission line. The driver includes a first FET, a main charging stage, a discharging stage, and a temperature compensation circuit. The temperature compensation circuit is coupled to the main charging stage and the discharging stage and adjusts the level of the main charging current and the level of the discharging current to compensate for variations in temperature and controls the length of the main charging time period.

In another embodiment of the present invention, a driver is provided for providing binary signals from a data system to a transmission line. The driver includes a first FET, a main charging stage, a discharging stage, and an initial charging stage. The initial charging stage provides an initial charging current to the gate of the first FET for a period of time not to exceed an initial charging time period. The initial charging time period has a length approximately equal to a period of time necessary to increase the gate voltage of the first FET from ground to the threshold voltage of the first FET.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 5 is a schematic diagram illustrating a CMOS transmission line driver in accordance with the present invention.

FIG. 9A is a schematic diagram illustrating control logic circuitry that may be used for programming the temperature compensation circuit shown in FIG. 8, and FIG. 9B is a truth table for the control logic circuitry shown in FIG. 9A.

FIGS. 10A, 10B and 10C are a more detailed schematic diagram illustrating the transmission line driver shown in FIG. 5.

FIG. 11 is a more detailed schematic diagram illustrating the main stage pulse generation circuitry that may be used in the transmission line driver shown in FIGS. 5 and/or 10.

DETAILED DESCRIPTION OF THE PREFERRED EMBODIMENT

Figure 1:
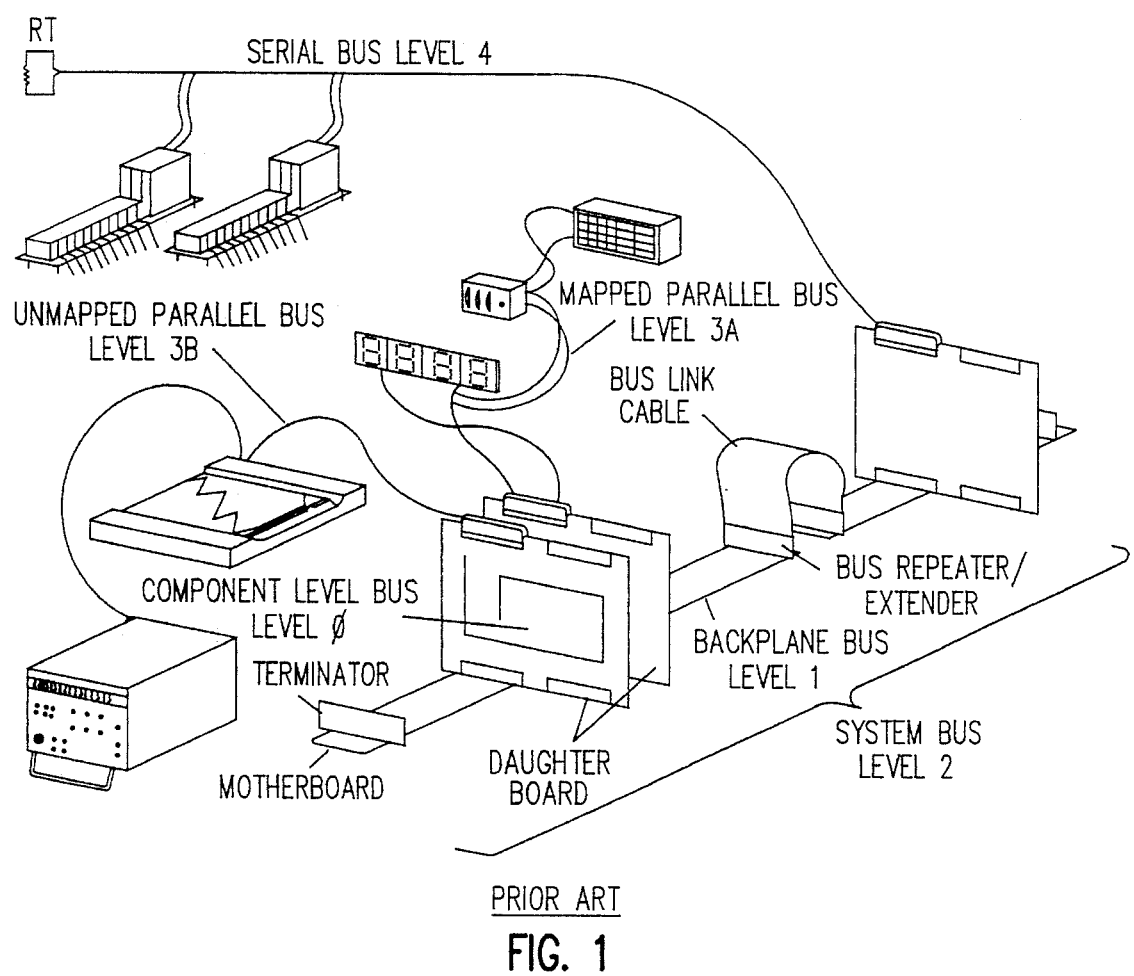
FIG. 1 is a pictorial illustration of the hierarchy of bus levels in a Futurebus+ system.
Figure 2:
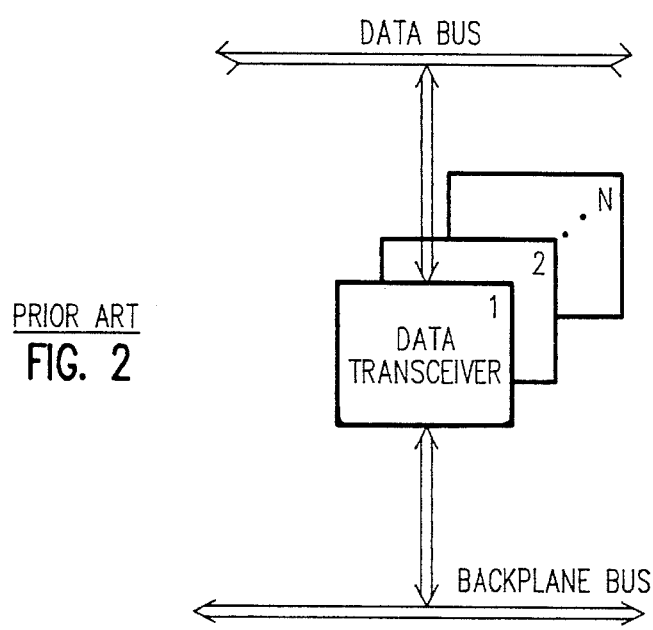
FIG. 2 is a block diagram illustrating the placement of a data transceiver between the backplane bus of a Futurebus+ system and the data bus of a processor in the Futurebus+ system.

FIG. 5 shows a programmable CMOS transmission line driver 100 in accordance with the present invention. It is referred to herein as the "KTL" driver 100. The KTL driver 100 is used for transferring data signals generated by a data system, such as a VLSI circuit, to a transmission line 102. The KTL driver 100 has a programmable output voltage swing at output $V_{OUT}$, and it has programmable edge rate control. It is a high speed bus driver that may be operated at a data rate of 250 MHz or more, and it has low output pulse distortion.

The KTL driver 100 is designed to receive CMOS level binary signals, i.e., digital signals having a voltage swing of approximately 0 Volts (logic low) to 3.3 Volts (logic high), from a data system at the input $V_{IN}$. The KTL driver 100 includes level shifting capability so that the data signals provided to the transmission line 102 via output $V_{OUT}$ operate within a different nominal voltage swing. The voltage swing of output voltage $V_{OUT}$ of the KTL driver 100 is programmable. Specifically, output voltage $V_{OUT}$ may be programmed to be in accordance with the Backplane Transceiver Logic (BTL) standard, i.e., digital signals having a voltage swing of approximately 1.0 Volt (logic low) to 2.1 Volts (logic high), or the so called "GTL" signal levels discussed above of 0.3 Volts±0.1 Volt (logic low) to 1.2 Volts±5% (logic high), depending upon supply voltage variations. Thus, the output of the KTL driver 100 may be programmed to be compatible with the BTL standard and the so-called "GTL" levels.

The transmission line 102 generally has a relatively low impedance and is terminated to voltage levels $V_T$. The transmission line 102 is typically a microstrip trace or a strip line trace having a characteristic impedance on the order of about 50Ω–70Ω. Normally, the transmission line 102 has its opposite ends terminated in its characteristic impedance so that the effective resistance of the parallel terminating resistors $R_T$ is approximately 25Ω–35Ω. If the KTL driver 100 is programmed to operate at BTL signal levels, then the voltage $V_T$ is equal to 2.1 Volts; on the other hand, if the KTL driver 100 is programmed to operate at GTL signal levels, then the voltage $V_T$ is equal to 1.2 Volts.

The KTL driver 100 shown in FIG. 5 is implemented with n-channel and p-channel field-effect transistors (FETs), i.e., it is a CMOS device and utilizes no bipolar transistors. The CMOS implementation overcomes the problems associated with large scale integration of the bipolar driver 20 described above, i.e., low gate density and high cost.

The KTL driver 100 generally includes an output stage 104, a main charging stage 106, a discharging stage 108, an initial charging stage 110, and a temperature compensation circuit 40. The main charging stage 106, the initial charging stage 110, and the discharging stage 108 are responsive to data signals received at input VIN and cause the output stage 104 to generate either a logic low or logic high signal at the output node $V_{OUT}$. One of the functions of the output stage 104 is to interface with the transmission line 102 and to provide data signals to the transmission line 102. An output node $V_{OUT}$ is connectable to the transmission line 102. The output stage 104 conducts current from the output node $V_{OUT}$ to ground.

The output stage 104 includes a very wide channel, open drain, n-channel MOSFET M10. The drain of transistor M10 is coupled to the transmission line 102 and the source is coupled to ground. The channel width of transistor M10 should be orders of magnitude greater than its channel length to reduce the effective resistance of its drain-source circuit during conduction. Preferably, transistor M10 has a channel width of 1200 μm and a channel length of 1 μm. Furthermore, although only a single transistor M10 is shown, it is to be understood that it may be fabricated by connecting any number of n-channel transistors in parallel with each other; such parallelism may be used for producing a transistor M10 of the desired effective channel width.

The purpose of the main charging stage 106 is to provide a main charging current $I_{main}$ to the gate of transistor M10. Charging the gate of transistor M10 pulls it high which switches transistor M10 into a conducting state. Transistor M10 conducts current from the output node $V_{OUT}$ to ground. Current flows through resistors $R_T$ and creates a voltage drop thereacross which causes the voltage at output $V_{OUT}$ to go low. A voltage sensing amplifier 112 is used for sensing when $V_{OUT}$ is approximately equal to its preprogrammed logical low level. The value of $V_{OUT}$ in its low state depends upon whether the KTL driver 100 is programmed to be BTL or GTL compatible.

As will be discussed in more detail below, the main charging stage 106 provides the main charging current $I_{main}$ to the gate of transistor M10 for a period of time not to exceed a main charging time period $t_{main}$. The main charging current $I_{main}$ is provided to the gate of transistor M10 long enough to switch it on. Once transistor M10 is switched into the conducting state, the main charging current $I_{main}$ is stopped in order to conserve power.

The purpose of the initial charging stage 110 is to provide an initial charging current $I_{init}$ to the gate of transistor M10 for a period of time not to exceed an initial charging time period $t_{init}$. The initial charging time period $t_{init}$ is shorter than the main charging time period $t_{main}$. The initial charging current $I_{init}$ quickly charges the gate of transistor M10 up to the point where the gate-source voltage is approximately equal to the threshold voltage $V_{TH}$. In other words, the initial charging current $I_{init}$ quickly increases the gate voltage of transistor M10 to the point where transistor M10 starts conducting current and pulling output $V_{OUT}$ low. The initial charging time period $t_{init}$ has length approximately equal to the period of time necessary to increase the gate voltage of transistor M10 from ground to the threshold level $V_{TH}$. Preferably, the initial charging time period $t_{init}$ is approximately equal to one logic gate delay time.

The purpose of the discharging stage 108 is to provide a discharging current $I_{dis}$ from the gate of transistor M10 to ground. Discharging the gate of transistor M10 switches it into a non-conducting state. When transistor M10 is in a non-conducting state, current is no longer conducted from output $V_{OUT}$ to ground. This causes output $V_{OUT}$ to go high because current stops flowing through resistors $R_T$. The value of $V_{OUT}$ in its high state depends upon whether the KTL driver 100 is programmed to be BTL or GTL compatible.

The main charging stage 106 includes a voltage sensing amplifier 112, main stage pulse generation circuitry 114, a p-channel switching transistor M12, a p-channel current source transistor M15, and a smaller p-channel current source transistor M22. Transistor M12 has its source connected to a supply voltage $V_{DD}$, its gate connected to the output of the main stage pulse generation circuitry 114, and its drain is connected to the source of transistor M15. The drain of transistor M15 is connected to the input $V_{VSAIN}$ of the voltage sensing amplifier 112, and the output $V_{OS1}$ of the voltage sensing amplifier 112 is connected directly to the gate of transistor M10. Transistor M22 has its source connected to voltage supply VDD, its gate connected to the gate of transistor M15, and its drain connected to input $V_{VSAIN}$. The voltage sensing amplifier 112 is a simple, well-known single stage CMOS differential amplifier. The amplifier 112 compares a reference input voltage $V_{REF}$ to the KTL driver 100 output voltage $V_{OUT}$. The KTL driver 100 is programmed to output BTL or GTL level signals by setting $VRE_F$ equal to 1.0 Volt for BTL or grounded for GTL. The amplifier 112 senses when the voltage at the output node $V_{OUT}$ is substantially equal to the programmed logical low level.

Figure 6:
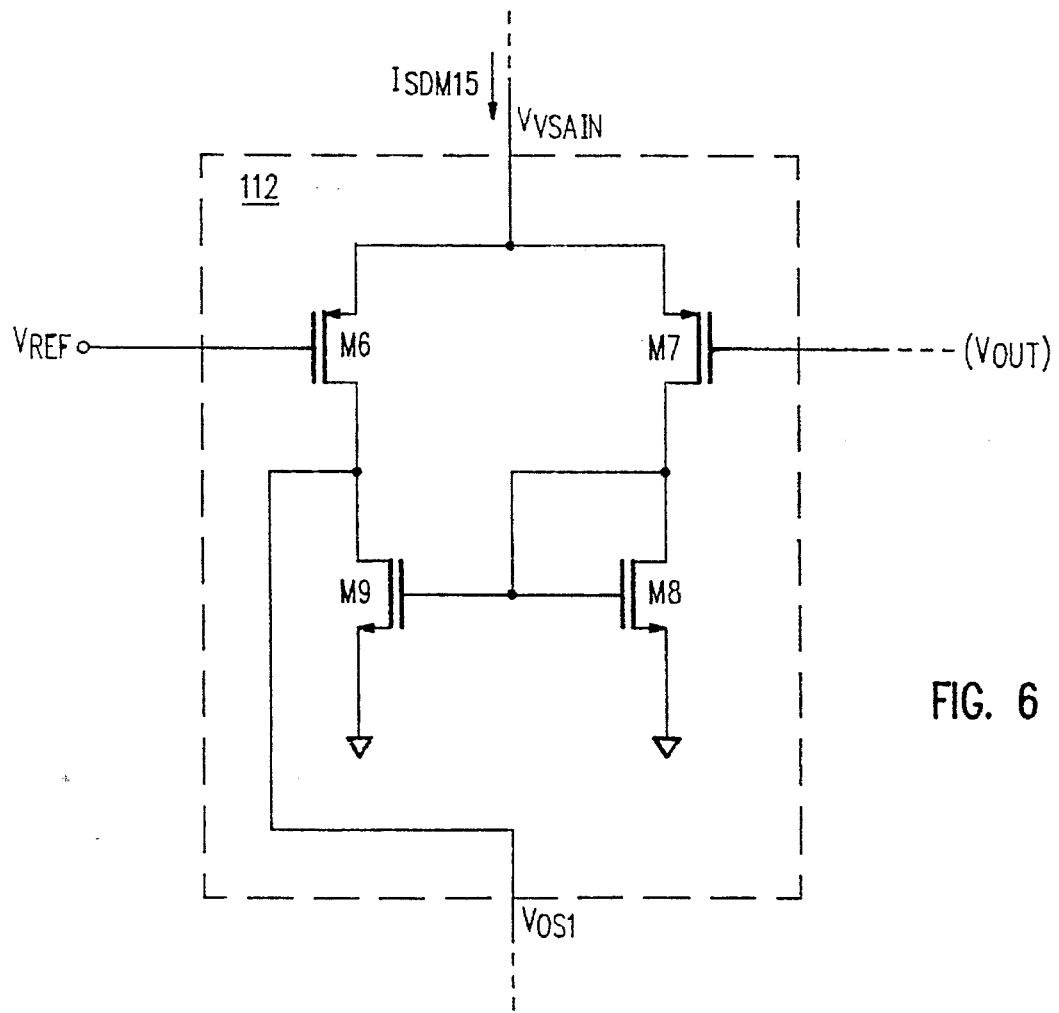
FIG. 6 is a schematic diagram illustrating a voltage sensing amplifier that may be used in the transmission line driver shown in FIG. 5.

FIG. 6 shows the detailed structure of the voltage sensing amplifier 112. Two p-channel transistors M6 and M7 have their sources connected to $V_{VSAIN}$, i.e., the drain of transistor M15. The drains of transistors M6 and M7 are connected to the drains of two n-channel transistors M9 and M8, respectively, that have their sources grounded. The gates of transistors M9 and M8 are connected together and to the drain of transistor M7. The gate of transistor M6 is connected to the reference voltage $V_{REF}$, and the gate of transistor M7 is connected to the output node $V_{OUT}$. Finally, the drain of transistor M6 is connected to $V_{OS1}$, i.e., the gate of transistor M10.

Referring back to FIG. 5, the gate of the current source transistor M15 is connected to one output $V_{OP}$ of a programmable CMOS temperature compensation circuit 40. The temperature compensation circuit 40, along with the current source transistor M15, provide a means for adjusting the source-drain current $I_{SD}$ conducted by transistor M12 to compensate for temperature and voltage supply $V_{DD}$ variations. The effects of temperature and supply voltage variations on MOSFET transistors, as well as the structure and operation of the temperature compensation circuit 40, will be described in detail below with reference to FIGS. 7 and 8. For the present discussion regarding the basic operation of the KTL driver 100, however, it can be assumed that the output $V_{OP}$ maintains a source-gate potential $V_{SG}$ on transistor M15 such that it will conduct current whenever transistor M12 is switched on.

The purpose of the main stage pulse generation circuitry 114 is to provide a main pulse to the gate of transistor M12. The main pulse is a negative pulse and has a length approximately equal to the main charging time period $t_{main}$. Because transistor M12 is a p-channel transistor, the negative main pulse switches transistor M12 on so that it conducts current for a period of time approximately equal to the main charging time period $t_{main}$. Therefore, the voltage sensing amplifier 112 conducts current to the gate of transistor M10 for a period of time that does not exceed the main charging time period $t_{main}$.

The main stage pulse generation circuitry 114 includes a p-channel transistor M16 and an n-channel transistor M18 connected to form a CMOS inverter 117. The drains of transistors M16 and M18 form the output of the CMOS inverter 117, and the gates of transistors M16 and M18 are connected together to form the input of the CMOS inverter 117. A NAND gate 118 has its output connected to the gate of transistor M12, one of its inputs connected to the drain of transistor M16 (the output of the CMOS inverter 117), and its other input connected to the input of the CMOS inverter 117. The input of the CMOS inverter 117 is connected to the input node $V_{IN}$ of the KTL driver 100.

The CMOS inverter 117 has a propagation delay that can be adjusted by the temperature compensation circuit 40. Specifically, an n-channel transistor M17 is connected in series with transistors M16 and M18. The gate of transistor M17 is connected to output $V_{ON}$ of the temperature compensation circuit. As will be described in detail below, the temperature compensation circuit 40 varies the gate voltage of transistor M17, via $V_{ON}$, to compensate for temperature and supply voltage $V_{DD}$ variations. In addition, however, the output $V_{ON}$ of the temperature compensation circuit 40 can be selectively programmed to be several different values, resulting in the gate voltage of transistor M17 being programmable to several different values. As will be explained below, outputs $V_{ON}$ and $V_{OP}$ are programmed by the binary settings of inputs C1 and C2. By programming the gate voltage of transistor M17, the current conducted by transistor M17 is also thereby programmed.

The propagation delay of the CMOS inverter 117, i.e., the time between 50% of its input switching transition and 50% of its output switching transition, is dependent upon the speed at which its output goes high and low. The speed at which the output goes high and low depends upon the strength of the CMOS inverter 117 charging current conducted by transistor M16 and the strength of the CMOS inverter 117 discharging current conducted by transistor M18. The propagation delay of the CMOS inverter 117 will change if the charging and discharging currents are changed.

Because the current conducted by transistor M17 is adjustable by the temperature compensation circuit 40, the discharging current of the CMOS inverter 117 conducted by transistor M18 is also adjustable. By adjusting the discharging current of the CMOS inverter 117, the speed at which its output is pulled low is adjusted. Thus, the output high to low propagation delay time of the CMOS inverter 117 is adjustable by the temperature compensation circuit 40.

The NAND gate output 118 will only go low when both of its inputs are high. As will be explained in more detail below, both inputs of the NAND gate 118 will be high only for a period of time approximately equal to the high to low propagation delay of the CMOS inverter 117. The high to low propagation delay of the CMOS inverter is approximately equal to the main charging time period $t_{main}$. Thus, the main charging time period $t_{main}$, which is the amount of time that transistor M12 is in the conducting state, is programmed by programming the high to low propagation delay of the CMOS inverter 117.

The initial charging stage 110 includes three p-channel transistors M19, M20, and M21 that are connected in series between voltage supply $V_{DD}$ and the gate of transistor M10. The gate of transistor M20 is connected to output $V_{OP}$ of the temperature compensation circuit 40 to compensate the initial charging stage 110 for temperature and supply voltage $V_{DD}$ variations.

The gates of transistors M19 and M21 are connected to initial stage switching circuitry, comprised of inverters 120, 122, and 124, for switching transistors M19 and M21 into simultaneous conducting states for the initial charging time period $t_{init}$. When transistors M19, M20, and M21 are all in the conducting state, then the initial stage charging current is provided to the gate of transistor M10. If transistors M19, M20, and M21 are only in simultaneous conducting states for the initial charging time period $t_{init}$, then the initial charging current $I_{init}$ is provided to the gate of transistor M10 only for the initial charging time period $t_{init}$.

The initial charging time period $t_{init}$ is preferably equal to approximately one logic gate delay time. Inverter 120 is connected between input $V_{IN}$ and the gate of transistor M21, and inverters 122 and 124 are connected in series between $V_{IN}$ and the gate of transistor M19. When the gate of transistor M21 goes from high to low to switch transistor M21 on, the gate of transistor M19 will remain low for the delay time of inverter 124. Thus, inverters 120, 122, and 124 switch transistors M19 and M21 into simultaneous conducting states for one logic gate delay time period. Transistor M20 is held in its conducting state by output VOP of the temperature compensation circuit 40.

The discharging stage 108 includes an n-channel switching transistor M13 having its source connected to ground, its gate connected to the output of an inverter 116, and its drain connected to the source of an n-channel current source transistor M14. The drain of the current source transistor M14 is connected directly to the gate of transistor M10, and the gate of the current source transistor M14 is connected to the other output $V_{ON}$ of the programmable CMOS temperature compensation circuit 40. Similar to output $V_{OP}$ and transistor M15, it can be assumed for the present discussion that the output $V_{ON}$ maintains a gate-source potential $V_{GS}$ on transistor M14 such that it will conduct current whenever transistor M13 is switched on.

Figure 7:
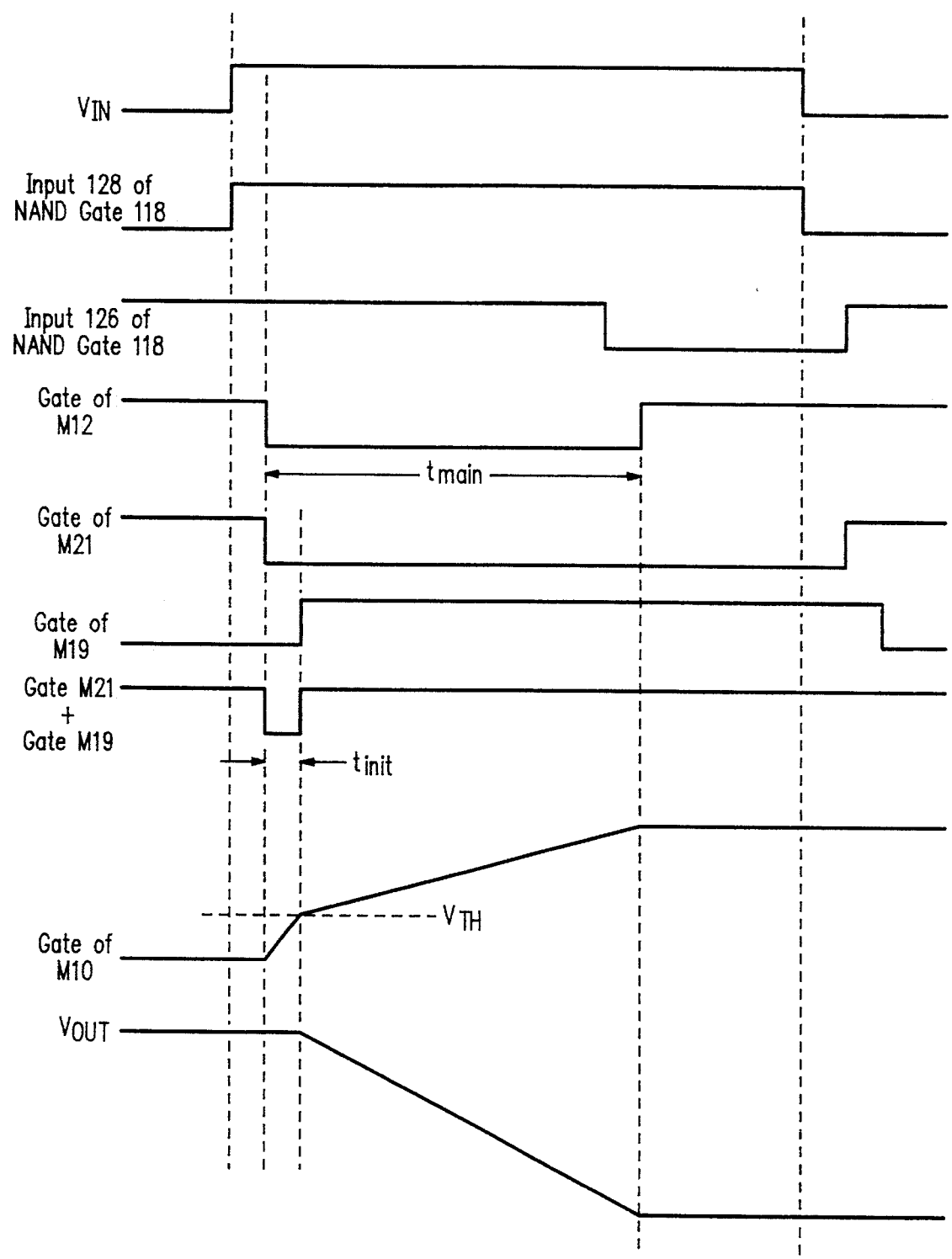
FIG. 7 is timing diagram illustrating some of the signal levels generated by the transmission line driver shown in FIG. 5.

FIG. 7 shows a timing diagram for the KTL driver 100. In order to describe the operation of the KTL driver 100, it will be assumed that the input $V_{IN}$ initially receives a low or logic "0" level CMOS signal, i.e., $V_{IN}=0$ Volts. Thus, the initial charging stage 110 receives a low input, the main stage pulse generation circuitry 114 receives a low input, and the discharging stage 108 receives a high input due to inverter 116. The high input received by the discharging stage 108 pulls the gate of transistor M13 high which holds it in a conducting state. Because transistor M13 is conducting, it provides a discharge path from the gate of transistor M10 to ground. This pulls the gate of transistor M10 low which switches it into a non-conducting state. Because transistor M10 is not conducting, output $V_{OUT}$ is pulled high to $V_T$ level. The value of $V_T$ depends upon whether the KTL driver is programmed to be BTL or GTL compatible.

Because it is assumed that $V_{IN}$ has been low for awhile, inverter 120 of the initial charging stage 110 pulls the gate of transistor M21 high, and inverters 122 and 124 pull the gate of transistor M19 low. Because the gate of transistor M21 is pulled high, transistor M21 does not conduct current and no initial charging current $I_{init}$ is provided to the gate of transistor M10.

Turning to the main charging stage 106, input 128 of the NAND gate 118 is pulled low because it is coupled to input $V_{IN}$. Input 126 of the NAND gate 118 is pulled high because it is coupled to the output of the CMOS inverter 117. The output of the CMOS inverter 117 is high because the low input $V_{IN}$ causes transistor M16 to be in the conducting state and transistor M18 to be in the non-conducting state. Because the NAND gate 118 has one input pulled low, it pulls the gate of transistor M12 high.

The high output of the NAND gate 118 switches off the p-channel transistor M12. Because the p-channel transistor M12 is switched off, current source transistor M15 does not conduct current from source to drain. Because transistor M15 does not conduct current, the voltage sensing amplifier 112 is deenergized and its output $V_{OS1}$ has no effect on transistor M10. Thus, the main charging stage 106 has no effect on the signal generated at the output node $V_{OUT}$.

When the KTL driver 100 input $V_{IN}$ switches to a high or logic "1" level CMOS signal, i.e., $V_{IN}=3.3$ Volts, the initial charging stage 110 receives a high input, the main stage pulse generation circuitry 114 receives a high input, and the discharging stage 108 receives a low input due to inverter 116. The low input received at the discharging stage 108 pulls the gate of transistor M13 low which switches it into a non-conducting state. Thus, the discharge path from the gate of transistor M10 to ground is removed.

The high input received by the initial charging stage 110 causes the gate of transistor M21 to be pulled low after one logic gate delay caused by inverter 120 and the gate of transistor M19 to be pulled high after two logics gate delays caused by inverters 122 and 124. This results in the gates of transistors M19 and M21 being pulled low simultaneously for one logic gate delay. For this one logic gate delay, referred to herein as the initial charging time period $t_{init}$, the initial charging stage 110 provides an initial charging current $I_{init}$ to the gate of transistor M10. The initial charging current $I_{init}$ quickly charges the gate of transistor M10 from ground level up to the threshold voltage $V_{TH}$ of transistor M10 ($V_{TH} \approx 0.8$ Volts). When the gate voltage of transistor M10 reaches its threshold level $V_{TH}$, transistor M10 begins to conduct current from output $V_{OUT}$ to ground. Current begins to flow through resistors $R_T$ and $V_{OUT}$ begins to be pulled low. However, about the time that the gate of transistor M10 reaches its threshold level $V_{TH}$, the initial charging current $I_{init}$ stops. The main charging stage 106 then takes over.

The high input received by the main stage pulse generation circuitry 114 immediately pulls input 128 of the NAND gate 118 high. Input 126 of the NAND gate 118 remains high for the delay time of the CMOS inverter 117. As explained above, the propagation delay of the CMOS inverter 117 is equal to the main charging time period $t_{main}$. For this time period both inputs 126 and 128 of the NAND gate 118 are pulled high. Thus, the gate of transistor M12 is pulled low by the negative pulse produced by the NAND gate 118 for the main charging time period $t_{main}$.

While transistor M12 is in the conducting state (during the main charging time period $t_{main}$), the current source transistor M15 conducts a current $I_{SDM15}$ from source to drain. Thus, the input $V_{VSAIN}$ of the voltage sensing amplifier 112 is energized. It should be noted that the voltage sensing amplifier 112 can only be energized by transistors M12 and M15 during the output turn-on transition period when the KTL driver 100 input $V_{IN}$ is set at logic "1" (high).

Referring to FIG. 6 along with FIG. 5, because the reference voltage $V_{REF}$ ($V_{REF}=1.0$ Volt for BTL or 0 Volts for GTL) is lower than $V_{OUT}$ (before $V_{IN}$ went high, $V_{OUT}=V_T=2.1$ Volts for BTL or 1.2 Volts for GTL), the p-channel transistor M6 conducts the current $I_{SDM15}$ conducted by transistor M15. The current $I_{SDM15}$ conducted by transistor M6 charges the gate of transistor M10, via output $V_{OS1}$, linearly upward at a rate of $I_{SDM15}/C_{gM1}$, where $C_{gM1}$ is the total node capacitance at the gate of transistor M10.

As shown in the timing diagram of FIG. 7, during the initial charging time period $t_{init}$, both the initial charging stage 110 and the main charging stage 106 charge the gate of transistor M10. This results in the gate voltage of transistor M10 rising very quickly to the threshold voltage VTH. However, the initial charging time period $t_{init}$ is shorter than the main charging time period $t_{main}$. After the initial charging time period $t_{init}$ is complete, only the main charging stage 106 continues to charge the gate of transistor M10 for the duration of the main charging time period $t_{main}$. Thus, the gate of transistor M10 is charged more slowly for the remainder of the main charging time period $t_{main}$.

As the gate-source voltage $V_{GSM10}$ of transistor M10 continues to rise, transistor M10 conducts more current from drain to source which continues to pull the output voltage $V_{OUT}$ gradually toward a lower level. Output voltage $V_{OUT}$ is pulled lower because the stronger current increases the voltage drop across resistors $R_T$. The voltage drop across resistors $R_T$ results in the voltage $V_T$ being divided between the resistors $R_T$ and the output node $V_{OUT}$.

When $V_{OUT}$ decreases down to a point where it is substantially equal to $V_{REF}$, transistor M6 stops conducting current to the gate of transistor M10. The voltage at the output node $V_{OUT}$ remains at the low signal level, i.e., $\approx 1$ Volt for BTL and $\approx 0.2$ to $0.4$ Volts for GTL. If voltage $V_{OUT}$ were to fall below $V_{REF}$ for some reason, then transistor M7 would begin to conduct current because it would have a lower gate voltage that transistor M6. Transistor M8 would begin to conduct current which would cause transistor M9 to conduct a substantially equal current because transistors M8 and M9 have equal channel sizes and form a current mirror. Transistor M9 tends to discharge the gate of transistor M10 which raises voltage $V_{OUT}$. When voltage $V_{OUT}$ rises to $V_{REF}$, transistor M7 stops conducting current. Thus, the main charging stage 106 maintains the output $V_{OUT}$ at a low level.

As long as the gate of transistor M12 is pulled low by the NAND gate 118, transistors M12 and M15 continue to conduct current to the voltage sensing amplifier 112. This strong charging current is not needed to keep the gate of transistor M10 charged so that it stays in the conducting state. Thus, this current tends to be a waste of power. However, at the end of the main charging time period $t_{main}$, the output of the NAND gate 118 goes high which pulls the gate of transistor M12 high. Thus, one purpose of the main stage pulse generation circuitry 114 is to shut off transistor M12 and M15 in order to conserve power. The p-channel transistor M22 which has a very small conducting channel continues to provide a small current to the voltage sensing amplifier 112 just to insure that the gate of transistor M10 remains high.

The output of the NAND gate 118 goes high at the end of the main charging time period $t_{main}$ because that is when the CMOS inverter finally pulls input 126 of the NAND gate 118 low. As will be explained in more detail below, the temperature compensation circuit 40 can be programmed to provide various voltages to the gate of transistor M17. Thus, the current conducted by transistor M17 can be programmed which means that the high to low propagation delay of the CMOS inverter 117, i.e., the main charging time period $t_{main}$, can be programmed. As will be explained below, the edge rate of the KTL driver 100 is programmed by programming the main charging time period $t_{main}$.

When input $V_{IN}$ is switched back to a low or logic "0" level CMOS signal, i.e., $V_{IN}$=0 Volts, the discharging stage 108 receives a high input due to inverter 116. The high input received by the discharging stage 108 pulls the gate of transistor M13 high which holds it in a conducting state. Because transistor M13 is conducting, it provides a discharge path from the gate of transistor M10 to ground. This pulls the gate of transistor M10 low which switches it into a non-conducting state which causes output $V_{OUT}$ to go high. Furthermore, the initial charging stage 110 receives a low input which after one logic gate delay causes the gate of transistor M21 to go high so that it is switched off. The main stage pulse generation circuitry 114 receives a low input which immediately pulls input 128 of the NAND gate 118 low so that transistor M12 remains switched off.

In summary, the main stage pulse generation circuitry 114 is used to generate a very narrow negative pulse to switch transistor M2 on to provide the main charging current $I_{main}$ to the gate of transistor M10 only for the output $V_{OUT}$ fall transition period. This eliminates the supply current during transistor M10's turn-on period in order to conserve power.

In the embodiment shown in FIG. 5, transistor M12 has a channel width=400 μm and a channel length=1 μm, transistor M13 has a channel width=100 μm and a channel length=1 μm, transistor M14 has a channel width=80 μm and a channel length=1 μm, transistor M15 has a channel width= 180 μm and a channel length=1 μm, transistor M16 has a channel width=10 μm and a channel length=1 μm, transistor M17 has a channel width=20 μm and a channel length=1 μm, and transistor M18 has a channel width=20 μm and a channel length=1 μm. In the embodiment shown in FIG. 6, transistors M6 and M7 have channel widths=200 μm and channel lengths=1 μm, and transistors M8 and M9 have channel widths=5 μm and channel lengths=2 μm. It should be understood that these are only preferred channel sizes and that they may be varied to suit the needs of a particular application.

Figure 3:
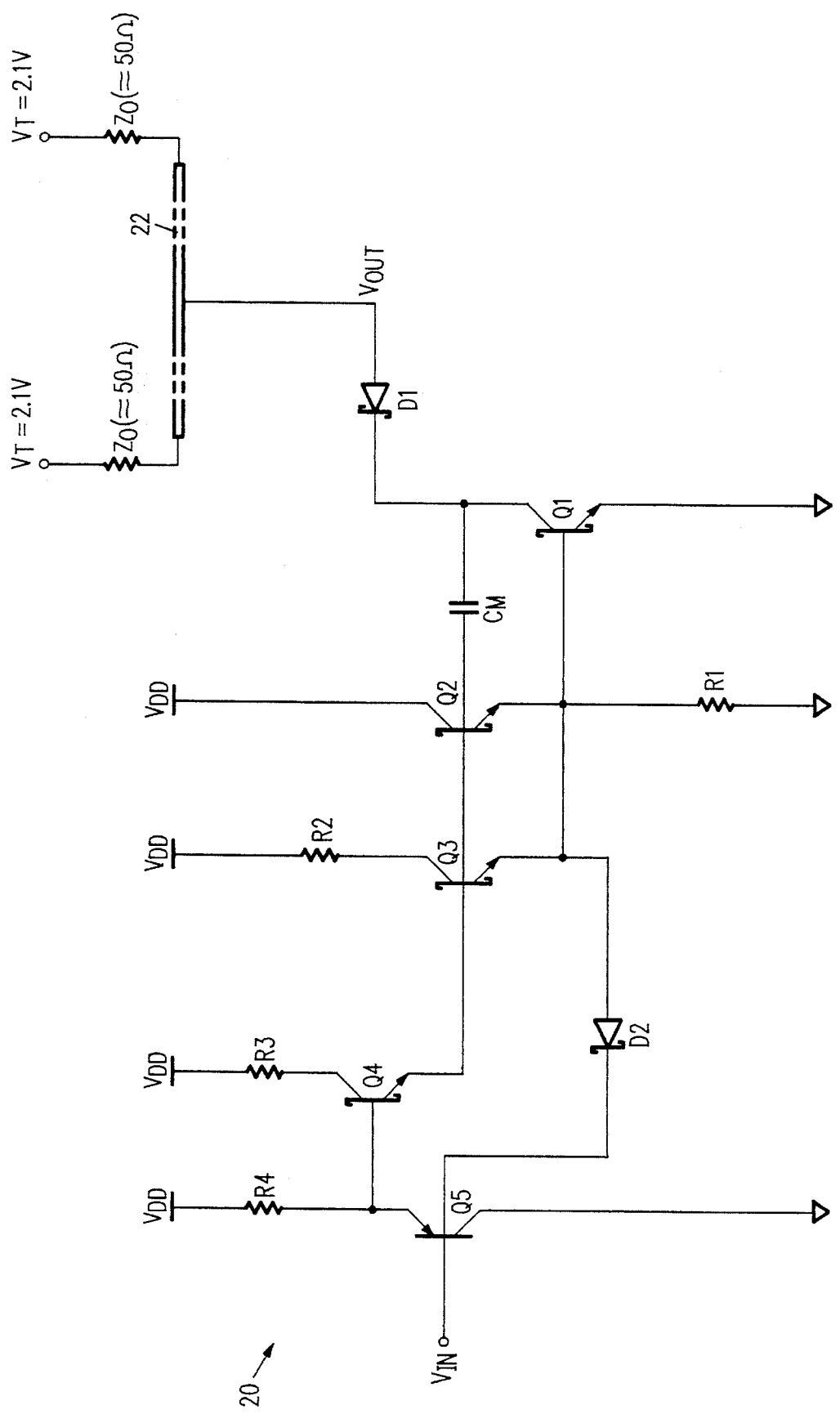
FIG. 3 is a schematic diagram illustrating a conventional bipolar transistor BTL transmission line driver.
Figure 4:
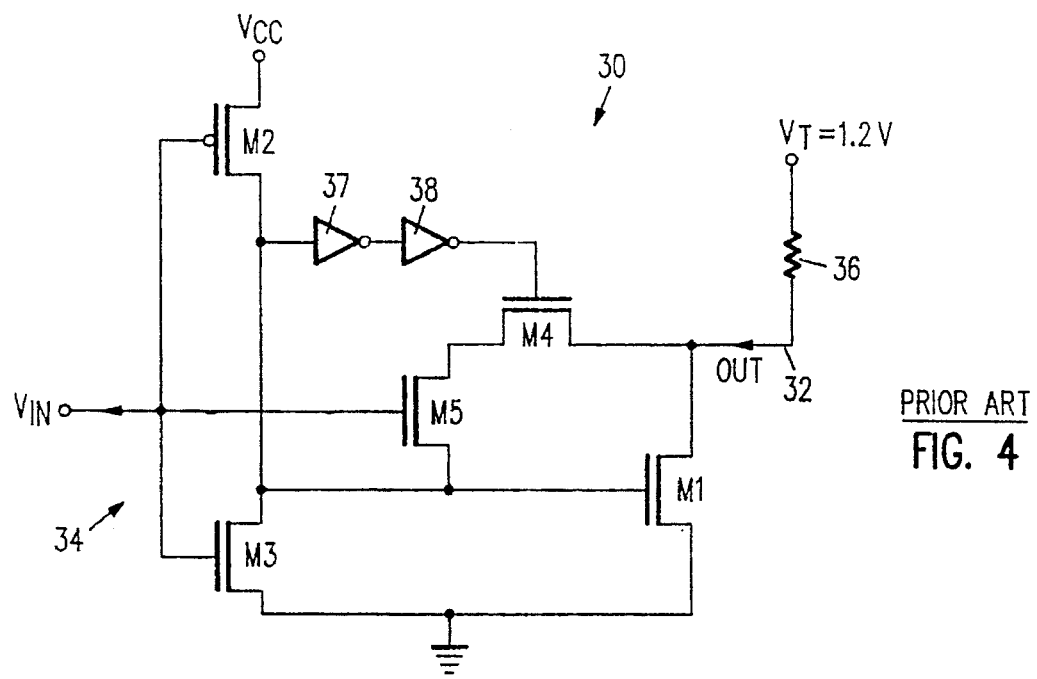
FIG. 4 is a schematic diagram illustrating a prior art "GTL" driver.

The programmable CMOS temperature compensation circuit 40, along with the current source transistors M15, M14, M17 and M20, provide a means for adjusting the currents conducted by transistors connected in series with these transistors in order to compensate for temperature and supply voltage $V_{DD}$ variations. Use of the temperature compensation circuit 40 with the KTL driver 100 prevents the problematic variations in rise-time $t_r$ and fall time $t_f$ due to variations in temperature and voltage supply $V_{DD}$ that plague the bipolar driver 20 shown in FIG. 3.

Temperature variations affect the performance of FETs. Temperature variations may be in the form of ambient temperature variations, i.e., variations in the temperature of the air surrounding integrated circuits, and/or junction temperature variations, i.e., variations in the temperature of the silicon in an integrated circuit. Ambient temperature variations can cause junction temperature variations, and vice versa.

FET performance is affected because temperature variations tend to cause the transconductance gm of the transistors to vary. The amount of current that is conducted by a transistor's current conducting channel, i.e., the current conducted between the drain and source ($I_{DS}$ for n-channel and $I_{SD}$ for p-channel), is determined in part by $g_m$. In the case of a MOSFET, when temperature increases, transconductance $g_m$ decreases which causes currents $I_{DS}$ and $I_{SD}$ to decrease. On the other hand, when temperature decreases, transconductance $g_m$ increases which causes $I_{DS}$ and $I_{SD}$ to increase. Thus, it may be said that the current conducted by the channel of a MOSFET has a negative temperature coefficient. Furthermore, $I_{DS}$, $I_{SD}$, and $g_m$ vary linearly with temperature variations.

Logic gates, such as the KTL driver 100, are typically constructed from several transistors. The speed of a logic gate is determined in part by the $I_{DS}$ of the individual transistors, which results in gate speed being proportional to $g_m$. If the $g_m$ of each transistor in a logic gate varies with temperature, then the $I_{DS}$ of each transistor also varies which causes the speed of the logic gate to vary with temperature. For example, when temperature increases, gate speed decreases, and when temperature decreases, gate speed increases.

Variations in gate speed due to temperature variations is an undesirable characteristic because such variations can adversely affect the synchronized timing operations of a digital system. Digital systems can be designed to operate more efficiently if the designer can be assured that gate speed will remain constant. Gate speed can be kept relatively constant if temperature is kept constant. However, because digital systems must operate in a variety of environments, ambient and junction temperature cannot always be controlled. A relatively constant logic gate speed can be maintained during temperature variations if the current conducted by the conducting channels of a logic gate's MOSFET transistors is maintained at relatively constant levels despite the temperature variations.

Figure 8:
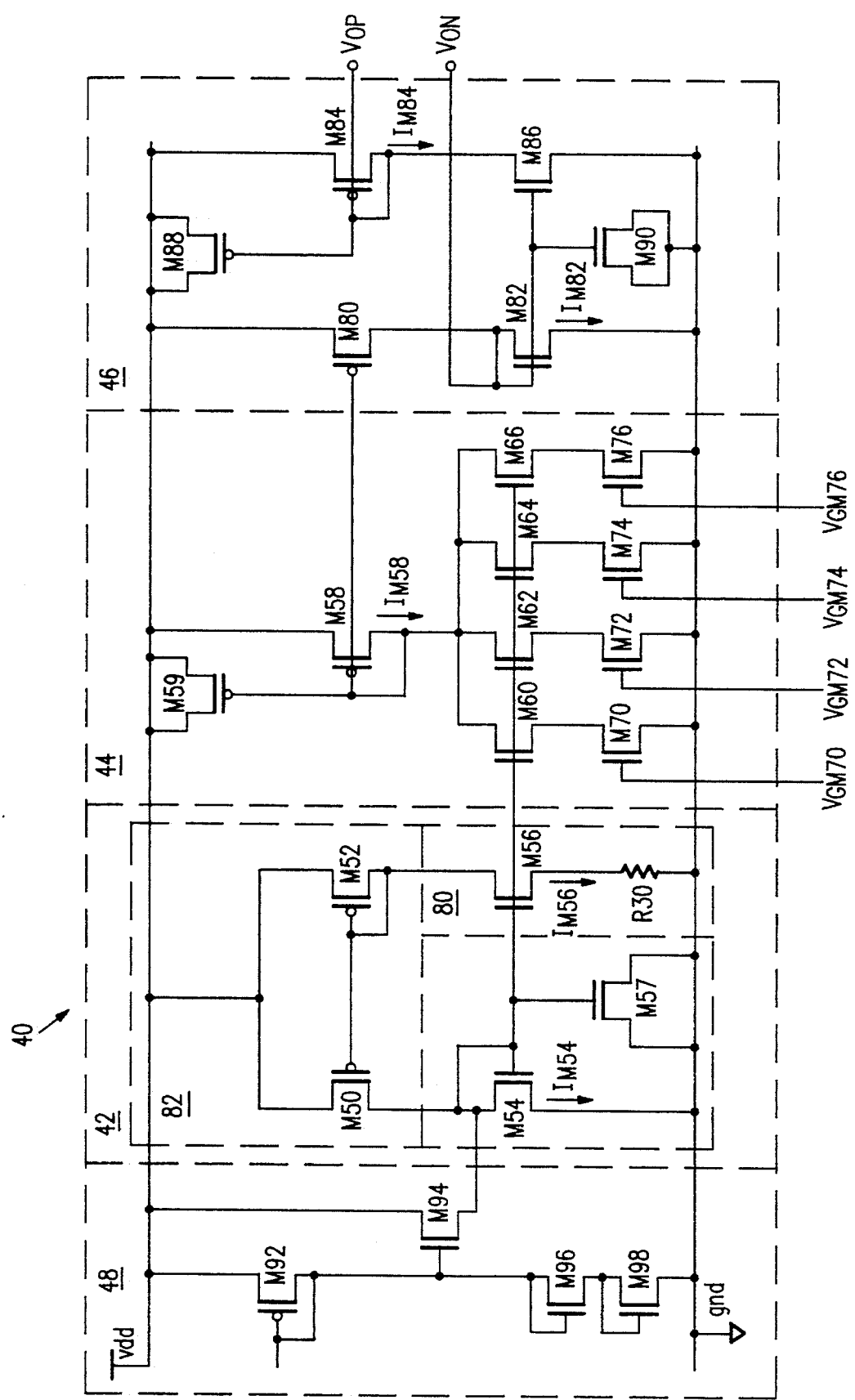
FIG. 8 is a schematic diagram illustrating a programmable CMOS temperature compensation circuit that may be used in the transmission line driver shown in FIG. 5.

FIG. 8 shows the detailed structure of the programmable CMOS temperature compensation circuit 40. The circuit 40 is capable of adjusting the currents $I_{DS}$ and $I_{SD}$ generated by transistors M14, M15, M17, and M20 to compensate for temperature and supply voltage $V_{DD}$ variations.

In general, the circuit 40 adjusts the IsD generated by transistors M15 and M20 to compensate for variations in temperature by adjusting transistor's gate voltage in response to the temperature variations. Because transistors M15 and M20 are p-channel MOSFETs, when temperature increases, the circuit 40 adjusts the gate voltage of the transistor, via output $V_{OP}$, so that the source-gate voltage $V_{SGM15}$ and $V_{SGM20}$ increases. By increasing the source-gate voltages, more current $I_{SD}$ will be conducted by the transistors' conducting channel which will compensate for the decrease in current $I_{SD}$ due to the increase in temperature. On the hand, when temperature decreases, the circuit 40 adjusts the gate voltages of transistors M15 and M20 so that the source-gate voltages $V_{SGM15}$ and $V_{SGM20}$ decrease. By decreasing the source-gate voltages, less current $I_{SD}$ will be conducted by the transistors' conducting channel which will compensate for the increase in current $I_{SD}$ due to the decrease in temperature.

The output $V_{ON}$ is for adjusting the gate voltage of the n-channel MOSFETs M14 and M17 to compensate for temperature variations. When temperature increases, $V_{ON}$ increases voltage $V_{GSM14}$ and $V_{GSM17}$ which causes more current $I_{DS}$ to be conducted by transistors' conducting channels. The increase in current Ios compensates for the decrease in current $I_{DS}$ due to the increase in temperature. On the other hand, when temperature decreases, $V_{ON}$ decreases voltage $V_{GSM14}$ and $V_{GSM17}$ which causes less current $I_{DS}$ to be conducted by the transistors' conducting channels. The decrease in current $I_{DS}$ compensates for the increase in current $I_{DS}$ due to the decrease in temperature.

Voltages $V_{SGM15}$, $V_{GSM14}$, $V_{GSM17}$, $V_{SGM20}$ may be adjusted (via $V_{OP}$ and $V_{ON}$) so that the currents $I_{SDM15}$, $I_{DSM14}$, etc., are maintained at relatively constant levels during temperature variations. Preferably, however, voltages $V_{SGM15}$, $V_{GSM14}$, etc., are adjusted so that the currents $I_{SDM15}$, $I_{DSM14}$, etc., actually increase during temperature increases and decrease during temperature decreases. In the later scenario, voltages $V_{SGM15}$ $V_{GSM14}$, etc., are simply increased or decreased slightly more than they would be in the first scenario. Increasing or decreasing the currents $I_{SDM15}$, $I_{DSM14}$, etc., according to the later scenario tends to compensate other transistors in the KTL driver 100 that have no direct temperature compensation system, such as the transistors in the voltage sensing amplifier 112 and transistor M10. For example, increasing the currents $I_{SDM15}$, $I_{DSM14}$, etc., in response to a temperature increase will tend to increase the current conducted by the other uncompensated MOSFETs in the circuit.

The temperature compensation circuit 40 includes a positive temperature coefficient current generation stage 42, a programmable current transfer and modification stage 44, an output stage 46, and a start-up stage 48.

The current generation stage 42 is an important component of the circuit 40 because it generates a drain-source current $I_{M54}$ in a MOSFET that has a positive temperature coefficient. In other words, when temperature increases, current $I_{M54}$ increases, and when temperature decreases, current $I_{M54}$ decreases. As discussed above, the current conducted by the channel of a MOSFET normally has a negative temperature coefficient. Because current $I_{M54}$ has a positive temperature coefficient, the current transfer and modification stage 44 and the output stage 46 are able to use current $I_{M54}$ to generate the outputs $V_{OP}$ and $V_{ON}$ which compensates for temperature variations.

The current generation stage 42 includes an n-channel transistor M54, a monitoring circuit 80, and a current generator 82. In general, the positive temperature coefficient current $I_{M54}$ is generated as follows: The current generator 82 generates and maintains two substantially equal currents $I_{M54}$ and $I_{M56}$ that are provided to the drain of transistor M54 and the monitoring circuit 80, respectively. When the strength of one of these currents changes, the current generator 82 changes the strength of the other current so that the two currents $I_{M54}$ and $I_{M56}$ remain substantially equal. The monitoring circuit 80 monitors the potential difference between the gate and source of transistor M54 and increases the strength of current $I_{M56}$ in response to an increase in temperature, and decreases the strength of current IM56 in response to a decrease in temperature. Whether current $I_{M56}$ is increased or decreased by the monitoring circuit 80, the current generator 82 adjusts current $I_{M54}$ so that the two currents remain substantially equal. Thus, current IM54 increases when temperature increases and decreases when temperature decreases.

The monitoring circuit 80 includes an n-channel transistor M56 which has its gate coupled to the gate of transistor M54. A resistor R30 is coupled between a first node that is common with the source of transistor M54 and a second node that is common with the source of transistor M56. In the embodiment shown in FIG. 8, the first node is ground.

As indicated in FIG. 8, transistor M56 has a larger current conducting channel than the current conducting channel of transistor M54. Preferably, the channel of transistor M56 has a width of 160 μm (micro-meters) and a length of 2 μm, and the channel of transistor M54 has a width of 40 μm and a length of 2 μm. As will be discussed below, the smaller channel size of transistor M54 results in $V_{GSM54}$ being larger than $V_{GSM56}$ when the channels of transistors M54 and M56 conduct equal currents.

The current generator 82 includes two p-channel transistors M50 and M52 that have their gates coupled together. Transistor M50 has its drain coupled to the drain of transistor M54. Transistor M52 has its drain coupled to its gate and to the drain of transistor M56. The sources of transistors M50 and M52 are coupled to a common node so that the transistors function as a current mirror. In the embodiment shown in FIG. 8, the common node is a supply voltage $V_{DD}$.

AS indicated in FIG. 8, transistors M50 and M52 have current conducting channels that are substantially the same size. Preferably, the channels of transistors M50 and M52 have widths of 80 μm and lengths of 2 μm. Furthermore, current $I_{M54}$ flows from the drain of transistor M50, and current $I_{M56}$ flows from the drain of transistor M52.

During operation, the equal currents $I_{M54}$ and $I_{M56}$ generated by the current generator 82 force the currents through transistors M54 and M56 to be equal. Because transistor M54 has a higher current density than transistor M56 (due to transistor M54 having a smaller conducting channel), the $V_{GS}$ of transistor M54, i.e., $V_{GSM54}$, is larger than the $V_{GS}$ of transistor M56, i.e., $V_{GSM56}$.

The drain-source current $I_{DS}$ of a MOSFET is equal to:

$$I_{DS} = \mu Co \frac{W}{L} (V_{GS} - V_{TH})^2$$

where,
W = conducting channel width;
L = conducting channel length;
$V_{TH}$ = threshold voltage;

$$\mu(T) \alpha \frac{1}{T^{1.5}} \text{; and}$$

T = temperature

From this equation it follows that, if current $I_{DS}$ of a MOSFET is held constant, then voltage $V_{GS}$ will increase when temperature increases, and vice versa. Thus, because the current generator 82 maintains both currents $I_{M54}$ and $I_{M56}$ at a relatively constant level, voltages $V_{GSM54}$ and $V_{GSM56}$ will both increase when temperature increases and both decrease when temperature decreases. Furthermore, because transistor M54 has a higher current density than transistor M56, voltage $V_{GSM54}$ will increase or decrease more than voltage $V_{GSM56}$.

The current through resistor R30 is equal to:

$$I_{R30}=(V_{GSM54}-V_{GSM56})/R30$$

Furthermore, $$I_{R30}=I_{M56}$$

As temperature increases, voltages $V_{GSM54}$ and $V_{GSM56}$ both increase with voltage $V_{GSM54}$ increasing more than voltage $V_{GSM56}$. Thus, the difference between voltages $V_{GSM54}$ and $V_{GSM56}$ increases as temperature increases which causes $I_{R30}$, and thus, current $I_{M56}$, to increase. Because transistors M50 and M52 are connected to operate as a current mirror, current $I_{M54}$ remains substantially equal to current $I_{M56}$. Therefore, as current $I_{M56}$ increases with increasing temperature, current $I_{M54}$ also increases. Conversely, as current $I_{M56}$ decreases with decreasing temperature, current $I_{M54}$ also decreases.

Briefly summarizing, the drain-source current $I_{DS}$ of a MOSFET normally has a negative temperature coefficient, i.e., as temperature increases, current $I_{DS}$ decreases. However, the drain-source current $I_{M54}$ of transistor M54 has a positive temperature coefficient, i.e., as temperature increases, current $I_{M54}$ increases. This phenomenon that occurs in the current generation stage 42 permits the other components of the circuit 40 to provide an output $V_{OP}$ to adjust the gate voltage of MOSFETs in order to compensate for variations in temperature.

It should also be noted that the positive temperature coefficient current generation stage 42 is normally not affected by variations in voltage supply $V_{DD}$. Specifically, transistors M50 and M52 operate in the saturation range while conducting currents $I_{M54}$ and $I_{M56}$. If the supply voltage $V_{DD}$ changes, then the source-drain voltages $V_{SD}$ of each transistor M50 and M52 also change because the drains of transistors M54 and M56 are very high impedance. However, the currents $I_{M54}$ and $I_{M56}$ do not change because the transistors M50 and M52 are operating in saturation. Current $I_{M54}$, which has a positive temperature coefficient, is not affected by variations in voltage supply $V_{DD}$. Therefore, the temperature compensation circuit 40 also compensates for variations in supply voltage $V_{DD}$.

It is envisioned that the n-channel transistors M54 and M56 could be replaced with p-channel transistors, and that the p-channel current generating transistors M50 and M52 could be replaced with n-channel transistors. In this scenario, p-channel transistors M54 and M56 would have different size conducting channels and have their sources coupled to $V_{DD}$, and n-channel transistors M50 and M52 would have equal size conducting channels and have their sources coupled to ground.

An n-channel transistor M57, which is optional, is used to filter out noise that may be present on the ground line. Transistor M57 is capacitor connected between ground and the gates of transistors M54 and M56, i.e., transistor M57 has its source and drain coupled to ground and its gate coupled to the gates of transistors M54 and M56.

Noise that is present on the ground line will reach the sources of transistors M54 and M56 via their connections to ground. Capacitor connected transistor M57 will let noise pass to the gates of transistors M54 and M56. Because the noise is present at both the gate and source of transistors M54 and M56, the $V_{GS}$ of each transistor should remain relatively constant.

The programmable current transfer and modification stage generates a current $I_{M58}$ that may be selectively programmed to be any one of several values that are linear proportional to current $I_{M54}$ conducted by the channel of transistor M54. This programmability allows current $I_{M54}$ to be "modified" to have a desired value, and, whatever value is selected, current $I_{M58}$ will have a positive temperature coefficient. Thus, the temperature compensation provided by outputs $V_{OP}$ and $V_{ON}$ is capable of inducing currents in transistors M4 and M5 that are a fraction or a multiple of current $I_{M54}$.

The current transfer and modification stage 44 includes four n-channel transistors M60, M62, M64, and M66 that each have a different size current conducting channel. Each of the transistors M60, M62, M64, and M66 has its gate coupled to the gate of transistor M54 and its drain coupled to the drain of transistor M58. Furthermore, each of the transistors M60, M62, M64, and M66 forms a current mirror with transistor M54; in other words, the $V_{GS}$ of transistor M54 will be substantially equal to the $V_{GS}$ of each one of the transistors M60, M62, M64, and M66.

The current transfer and modification stage 44 also includes four n-channel transistors M70, M72, M74, and M76 which respectively couple the source of each of the transistors M60, M62, M64, and M66 to ground. The purpose of transistors M70, M72, M74, and M76 is to permit current $IM5_s$ to be selectively programmed to be conducted by the channel of only one of the transistors M60, M62, M64, and M66 at a time. The gate inputs $V_{GM70}$, $V_{GM72}$, $V_{GM74}$, and $V_{GM76}$, which switch transistors M70, M72, M74, and M76 "on" and "off", respectively, will normally be set such that only one of transistors M60, M62, M64, and M66 conducts current. Transistor M60 conducts current when transistor M70 is "on" transistor M62 conducts current when transistor M72 is "on", and so on In the embodiment shown in FIG. 8, transistor M60 has a channel width=80 µm and a channel length=2 µm, transistor M62 has a channel width=40 µm and a channel length=2 µm, transistor M64 has a channel width=27 µm and a channel length=2 µm, and transistor M66 has a channel width=20 µm and a channel length=2 µm. Furthermore, transistor M70 has a channel width=160 µm and a channel length=2 µm, transistor M72 has a channel width=80 µm and a channel length=2 µm, transistor M74 has a channel width=56 µm and a channel length=2 µm, and transistor M76 has a channel width=40 µm and a channel length=2 µm.

Current $I_{M58}$ will vary according to the "on/off" status of transistors M70, M72, M74, and M76 because these transistors determine which one of the transistors M60, M62, M64, and M66, which all have different channel sizes, will conduct current $I_{M58}$. Current $I_{M58}$ can be made equal to a fraction or a multiple of $I_{M54}$ by adjusting the channel size of the transistor which conducts $I_{M58}$. For example, when $I_{M58}$ is conducted through transistor M60, $I_{M58}$ will be twice as large as $I_{M54}$ because transistor M60's channel is twice as large as transistor M54's channel; when $I_{M58}$ is conducted through transistor M62, $I_{M58}$ will be equal to $I_{M54}$ because transistor M62's channel is the same size as transistor M54's channel. Thus:

$$\begin{aligned}I_{M58} &= 2\,I_{M54} &\text{when } M70 \text{ is ON}\\ &= 1\,I_{M54} &\text{when } M72 \text{ is ON}\\ &= 0.67\,I_{M54} &\text{when } M74 \text{ is ON}\\ &= 0.5\,I_{M54} &\text{when } M76 \text{ is ON}\end{aligned}$$

By selectively programming the inputs $V_{GM70}$, $V_{GM72}$, $V_{GM74}$, and $V_{GM76}$, current $I_{M54}$ is "transferred" to current $I_{M58}$ and "modified" to be a fraction or multiple of $I_{M54}$. The inputs $V_{GM70}$, $V_{GM72}$, $V_{GM74}$, and $V_{GM76}$ are controlled by logic circuitry which will be discussed below with reference to FIGS. 9A and 9B.

It should be noted that, because transistors M70, M72, M74, and M76 each have a channel size that is twice as large as their respective transistors M60, M62, M64, and M66, the presence of transistors M70, M72, M74, and M76 does not significantly affect the current mirror relationship between transistor M54 and transistors M60, M62, M64, and M66.

Using the mirror effect and adjusting the channel size of transistor M62 may seem like a complex way to modify current $I_{M54}$ because current $I_{M54}$ can also be modified by adjusting the value of resistor R30. However, the temperature coefficient of current $I_{M54}$ varies with its current level which is a function of the value of R30 and the channel width and length of transistors M54 and M56. Therefore, it is not desirable to adjust current $I_{M54}$ by varying R30 because such variation will also change current $I_{M54}$'s temperature coefficient.

The transfer and modification stage 44 also includes an optional capacitor connected p-channel transistor M59 that is coupled between $V_{DD}$ and the gate of transistor M58 in order to filter out noise that may be present in the $V_{DD}$ line. Specifically, transistor M59's source and drain are coupled to $V_{DD}$ and its gate is coupled to the gate of transistor M58.

The output stage 46 is coupled to the gate of transistor M58. The purpose of the output stage 46 is to generate two currents, $I_{M82}$ and $I_{M84}$, that are linearly proportional to current $I_{M58}$. Current $I_{M82}$ is used to generate output voltage $V_{ON}$ for application to the gates of n-channel MOSFETs to compensate for variations in temperature and supply voltage, and current $I_{M84}$ is used to generate output voltage $V_{OP}$ for application to the gates of p-channel MOSFETs to compensate for variations in temperature and supply voltage.

A p-channel transistor M80 has its source coupled to $V_{DD}$, its gate coupled to the gate of transistor M58, and its drain coupled to the drain of an n-channel transistor M82. Transistor M82 has its gate is coupled to its drain and its source coupled to ground. The channels of transistors M80 and M82 conduct current $I_{M82}$, and the gate of transistor M82 provides output $V_{ON}$.

Transistor M80 forms a current mirror with transistor M58; thus, the $V_{GS}$ of the two transistors will be substantially equal. Current $I_{M82}$ will be linear proportional to current $I_{M58}$ and have a positive temperature coefficient. The value of $I_{M82}$ will depend on the channel size of transistor M80. In the embodiment shown in FIG. 8, transistor M80 has a channel width=50 μm and a channel length=1 μm, and transistor M82 has a channel width=10 μm and a channel length=1 μm. Because transistor M80 has a larger channel than transistor M58, current $I_{M82}$ will be larger than current $I_{M58}$. It should be understood, however, that by adjusting the channel size of transistor M80, the strength of current $I_{M82}$ can be adjusted, and by adjusting the channel size of transistor M82, the output voltage $V_{ON}$, which is equal to $V_{GSM82}$, can be adjusted.

By connecting output $V_{ON}$ to the gate of n-channel transistor M4, a current mirror is formed between transistor M82 and transistor M4. Thus, the current conducted by the channel of transistor M4 will be linear proportional to current $I_{M82}$ and have a positive temperature coefficient.

A p-channel transistor M84 has its source coupled to $V_{DD}$, its gate coupled to its drain, and its drain coupled to the drain of an n-channel transistor M86. Transistor M86 has its source coupled to ground and its gate coupled to the gate of transistor M82. The channels of transistors M84 and M86 conduct current $I_{M84}$, and the gate of transistor M84 provides output $V_{OP}$.

Transistor M86 forms a current mirror with transistor M82; thus, the $V_{GS}$ of the two transistors will be substantially equal. Current $I_{M84}$ will be linear proportional to currents $I_{M82}$ and $I_{M58}$, and have a positive temperature coefficient. The value of $I_{M84}$ will depend on the channel size of transistor M86. In the embodiment shown in FIG. 8, transistor M86 has a channel width=26 μm and a channel length=1 μm, and transistor M84 has a channel width=80 μm and a channel length=1 μm. Because transistor M86 has a larger channel than transistor M82, current $I_{M84}$ will be larger than current $I_{M82}$. It should be understood, however, that by adjusting the channel size of transistor M86, the strength of current $I_{M84}$ can be adjusted, and by adjusting the channel size of transistor M84, the output voltage $V_{OP}$, which is equal to $V_{SGM84}$, can be adjusted.

By connecting output $V_{OP}$ to the gate of p-channel transistor M5, a current mirror is formed between transistor M84 and transistor M5. Thus, the current conducted by the channel of transistor M5 will be linear proportional to current $I_{M84}$ and have a positive temperature coefficient.

Optional capacitor connected p-channel transistor M88 and n-channel transistor M90 filter noise that may be present on the $V_{DD}$ and ground lines, respectively. Transistor M88 has its source and drain coupled to $V_{DD}$ and its gate coupled to the gate of transistor M84. Transistor M90 has its source and drain coupled to ground and its gate coupled to the gates of transistors M82 and M86.

The purpose of the start-up stage 48 is to feed current to transistor M54 when the voltage supply $V_{DD}$ initially starts from ground level so that transistor M54's conducting channel can begin to conduct current.

An n-channel transistor M94 has its drain coupled to $V_{DD}$ and its source coupled to the drain of transistor M54. A diode connected p-channel transistor M92 is coupled between $V_{DD}$ and the gate of transistor M94, and two diode connected n-channel transistors M96 and M98 couple the gate of transistor M94 to ground. In the embodiment shown in FIG. 8, transistor M94 has a channel width=5 μm and a channel length=2 μm, transistor M92 has a channel width=3 μm and a channel length=100 μm, and transistors M96 and M98 have channel widths=60 μm and channel lengths=2 μm. The channel sizes of transistors M92, M94, M96, and M98 may be varied to suit the needs of a particular application.

When voltage supply $V_{DD}$ initially starts from ground level, none of the transistors carry current. When $V_{DD}$ rises above three times the threshold voltage, i.e., 3 $V_{TH}$, of transistor M94, transistor M94 feeds current into the drain of transistor M54. As the channel of transistor M54 begins to conduct current, a voltage drop is induced across the gate and source of transistor M56. Transistor M56 begins to conduct current which causes transistor M52 to begin to conduct current. Due to the current mirror action, transistor M50 also begins to conduct current which feeds back to transistor M54. This positive feedback continues until the current conducted by transistor M56 reaches its final value. Because the gate of transistor M94 is clamped by diode connected transistors M96 and M98, the rise of the drain potential of transistor M54 eventually shuts off transistor M94.

FIG. 9A shows the control logic circuitry for programming transistors M70, M72, M74, and M76 so that only one of transistors M60, M62, M64, and M66 conducts current $I_{M58}$ at a time. The control logic includes two inverters 60 and 62 that receive at their inputs control signals C1 and C2, respectively. The output of inverter 60 is coupled to the input of an inverter 64 and the input of a buffer 66, and the output of inverter 62 is coupled to the input of an inverter 68 and the input of a buffer 70.

Four AND gates 72, 74, 76, and 78 receive the outputs of inverters 64 and 68 and buffers 66 and 70. Specifically, AND gate 72 receives the outputs of inverters 64 and 68, AND gate 74 receives the outputs of inverter 64 and buffer 70, AND gate 76 receives the outputs of buffer 66 and inverter 68, and AND gate 78 receives the outputs of buffers 66 and 70. AND gates 72, 74, 76, and 78 have their outputs $V_{GM70}$, $V_{GM72}$, $V_{GM74}$, and $V_{GM76}$ coupled to the gates of transistors M70, M72, M74, and M76, respectively.

FIG. 9B shows a truth table for the logic circuit of FIG. 9A. For each combination of control signals C1 and C2, only one of the outputs $V_{GM70}$, $V_{GM72}$, $V_{GM74}$, and $V_{GM76}$ will be logic "1" at a time.

The inputs C1 and C2 of the temperature compensation circuit 40 are used to program the output edge rate of the KTL driver 100 shown in FIG. 5. The fastest edge rate is achieved by applying logic "1" to C1 and C2, and slowest edge rate is achieved by applying logic "0" to C1 and C2 (See FIGS. 9A and 9B).

As mentioned above, the edge rate of the KTL driver 100 is programmable because the main charging time period $t_{main}$ is programmable. In order to decrease the main charging time period $t_{main}$ of the KTL driver 100, the current conducted by transistor M17 must be increased in order to speed up the CMOS inverter 117. The current conducted by transistor M17 is increased by setting inputs C1 and C2 of the temperature compensation circuit 40 such that current $I_{M54}$ is amplified which in turn amplifies output $V_{ON}$. If VON is increased, then the current conducted by transistor M17 increases which speeds up the CMOS inverter 117. Furthermore, $V_{OP}$ is decreased which increases the current conducted by transistor M15.

By increasing the current conducted by transistor M17, the high to low propagation delay of the CMOS inverter 117 is decreased which decreases the main charging time period $t_{main}$. However, a stronger main charging current $I_{main}$ is conducted by transistor M15. Therefore, the gate of transistor M10 is charged the full amount in a shorter time period. This results in output $V_{OUT}$ going low faster which decreases fall time $t_f$. Thus, the edge rate of the KTL driver 100 is speeded up by decreasing the main charging time period $t_{main}$.

It should be understood that the programmability feature of the current transfer and modification stage 44 that is implemented by the use of the several transistors M60, M62, M64, M66, M70, M72, M74, and M76, as well as the control logic circuitry shown in FIG. 9A, is optional. Current $I_{M54}$ may be modified, i.e., amplified, by simply substituting for transistors M60, M62, M64, and M66 various transistors that have various different channel sizes.

Therefore, the temperature compensation circuit serves the dual purposes of: 1) compensating the currents conducted by transistors M14, M15, M17, and M20 for variations in temperature, voltage supply $V_{DD}$, and process; and, 2) providing a means of programming the output edge rate of the KTL driver 100. Because of the temperature compensation circuit 40, the propagation delay of the KTL driver 100 is relatively insensitive to variations in temperature and voltage supply $V_{DD}$. This insensitivity to variations in temperature and voltage supply $V_{DD}$ greatly improves the KTL driver 100 over the prior art drivers 20 and 30 discussed above.

Figure 10A:
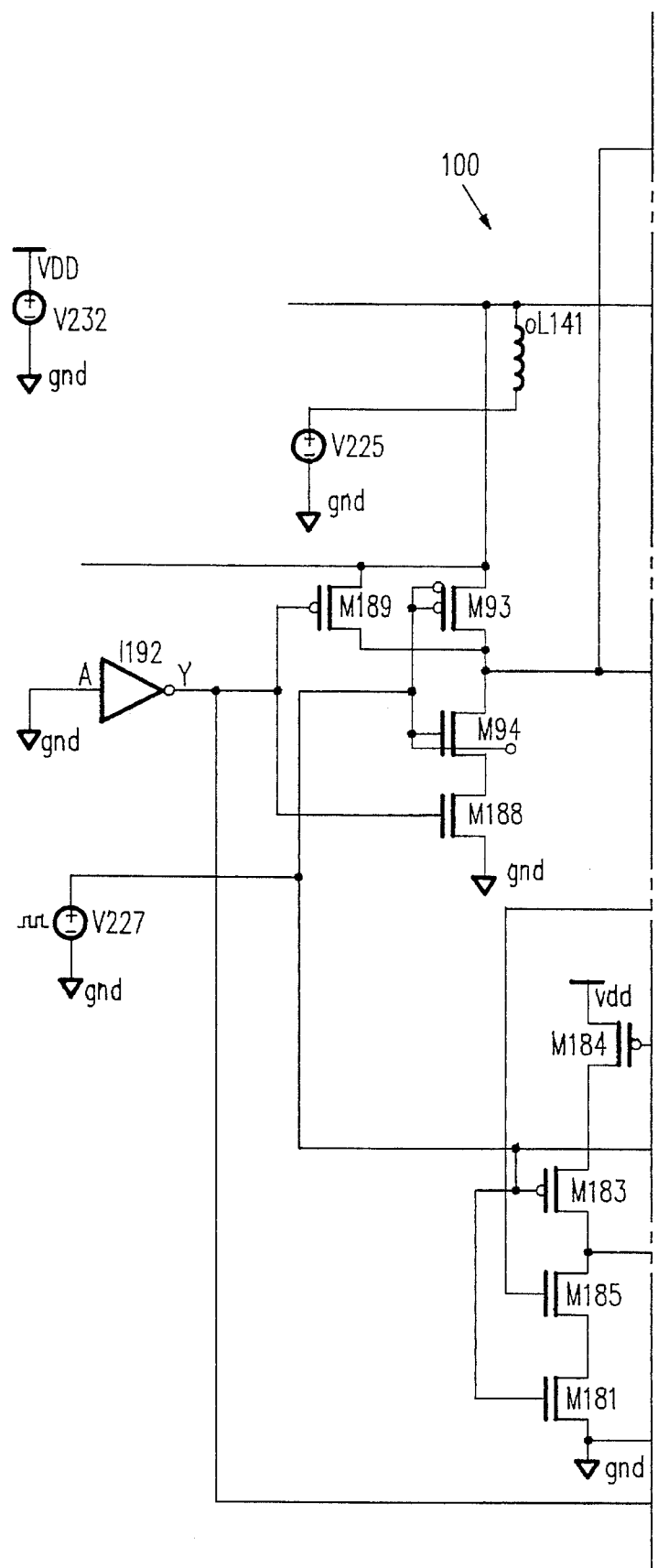
Figure 10B:
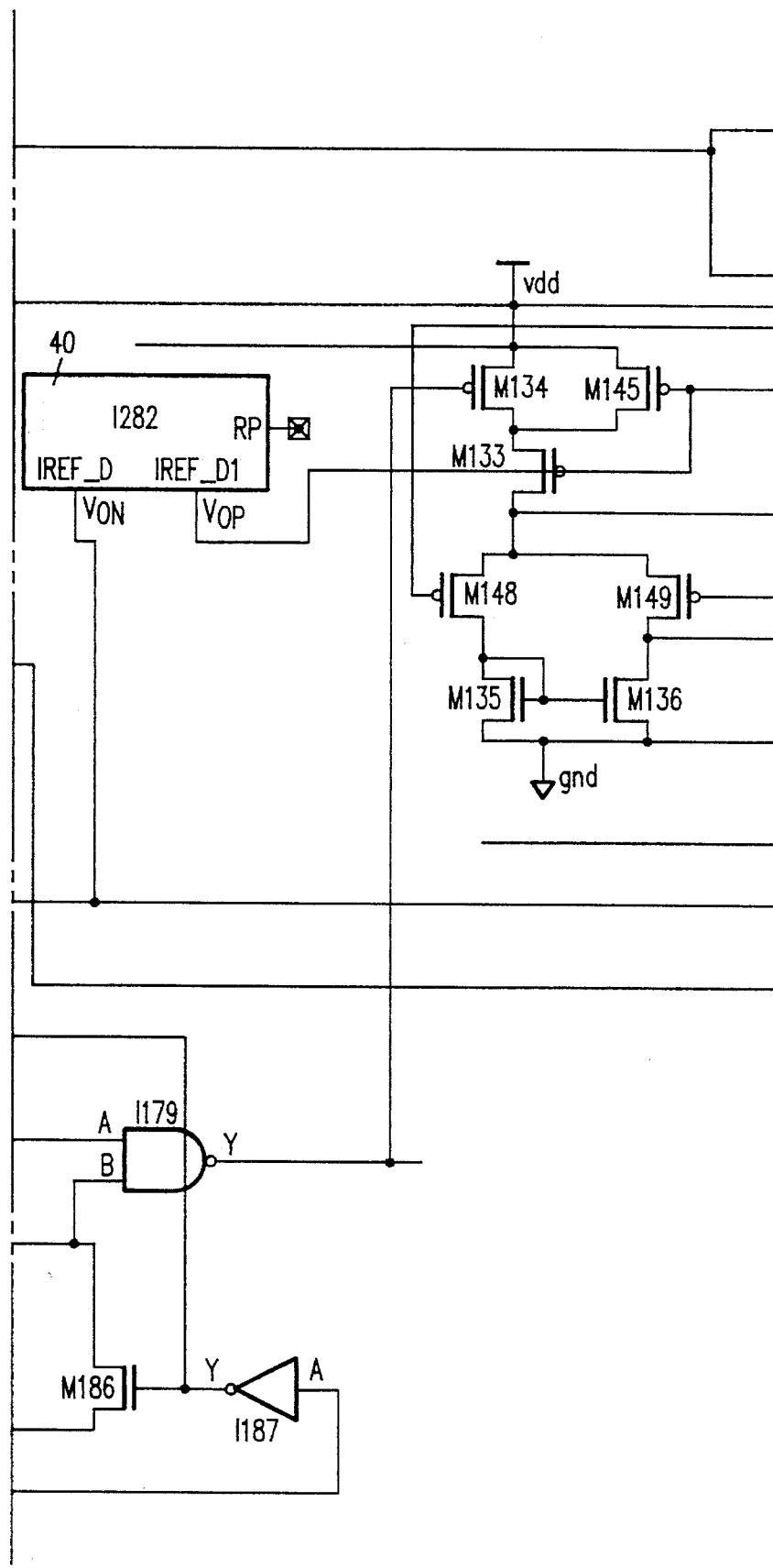

FIG. 10 shows a detailed schematic of the KTL driver 100, and FIG. 11 shows a detailed schematic of the main stage pulse generation circuitry 114.

It should be well understood that the specific channel sizes of the MOSFETs shown in FIGS. 5 through 11 and recited herein may be adjusted to achieve various different amplifications of generated currents and voltages without deviating from the spirit of the present invention.

Although the embodiment of the present invention shown in FIGS. 5 through 11 utilizes MOSFETs, it is envisioned that the present invention may also be used in connection with other technologies, such as junction FETs (JFETs) or Gallium Arsenide (GaAs).

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A driver for providing binary signals from a data system to a transmission line, the driver comprising:

an output node for connection to the transmission line;

a first field-effect transistor (FET) coupled between the output node and ground for conducting current from the output node to ground;

a main charging stage for providing a main charging current to the gate of the first FET for a period of time not to exceed a main charging time period, the main charging stage including a first logic circuit, responsive to the data system, for setting the main charging time period, the first logic circuit having a propagation delay time that is approximately equal to the main charging time period;

a discharging stage for providing a discharge current from the gate of the first FET to ground; and programming circuitry for programming the length of the main charging time period by adjusting the propagation delay time of the first logic circuit.

2. A driver according to claim 1, wherein the main charging stage comprises:

a second FET for conducting the main charging current; and a second logic circuit, responsive to the first logic circuit and the data system, for providing a main pulse to the gate of the second FET, the second logic circuit generating the main pulse for a length of time approximately equal to the propagation delay time of the first logic circuit.

3. A driver for providing binary signals from a data system to a transmission line, the driver comprising:

an output node for connection to the transmission line;

a first field-effect transistor (FET) coupled between the output node and ground for conducting current from the output node to ground;

a main charging stage for providing a main charging current to the gate of the first FET for a period of time not to exceed a main charging time period;

a discharging stage for providing a discharge current from the gate of the first FET to ground; and programming circuitry for programming the length of the main charging time period;

wherein the main charging stage includes:
a second FET for conducting the main charging current; and
main stage pulse generation circuitry for providing a main pulse to the gate of the second FET, the main pulse having a length approximately equal to the main charging time period;

wherein the main stage pulse generation circuitry includes:

a first CMOS inverter having an input, an output, and a propagation delay that can be adjusted by the programming circuitry, the first CMOS inverter including a first p-channel transistor connected in series with a first n-channel transistor, the gates of the first p-channel transistor and the first n-channel transistor being coupled together to form the input for the first CMOS inverter.

4. A driver according to claim 3, wherein the main stage pulse generation circuitry further comprises:

a NAND gate having an output coupled to the gate of the second FET, an input coupled to the output of the first CMOS inverter, and another input coupled to a driver input node for receiving data from the data system.

5. A driver according to claim 3, wherein the programming circuitry comprises:

a third FET connected in series with the first p-channel transistor and the first n-channel transistor of the first CMOS inverter; and a current generation circuit for controlling the gate voltage of the third FET.

6. A driver according to claim 5, wherein the programming circuitry further comprises:

a programmable current transfer and modification stage for selectively programming the gate voltage of the third FET.

7. A driver according to claim 5, wherein the current generation stage has a positive temperature coefficient and comprises:

a fourth field-effect transistor (FET);

a fifth FET having a larger current conducting channel than the current conducting channel of the fourth FET, the fifth FET having its gate coupled to the gate of the fourth FET;

a first resistor coupled between a first node that is common with the source of the fourth FET and a second node that is common with the source of the fifth FET; and current generating circuitry for generating and maintaining substantially equal drain currents in the fourth and fifth FETs.

8. A driver for providing binary signals from a data system to a transmission line, the driver comprising:

an output node for connection to the transmission line;

a first field-effect transistor (FET) coupled between the output node and ground for conducting current from the output node to ground;

a main charging stage for providing a main charging current to the gate of the first FET for a period of time not to exceed a main charging time period, the main charging stage including a first logic circuit, responsive to the data system, for setting the main charging time period, the first logic circuit having a propagation delay time that is approximately equal to the main charging time period;

a discharging stage for providing a discharge current from the gate of the first FET to ground; and a temperature compensation circuit coupled to the main charging stage and the discharging stage for adjusting the level of the main charging current and the level of the discharging current to compensate for variations in temperature and for controlling the length of the main charging time period by adjusting the propagation delay time of the first logic circuit.

9. A driver according to claim 8, wherein the main charging stage comprises:

a second FET for conducting the main charging current; and a second logic circuit, responsive to the first logic circuit and the data system, for providing a main pulse to the gate of the second FET, the second logic circuit generating the main pulse for a length of time approximately equal to the propagation delay time of the first logic circuit.

10. A driver for providing binary signals from a data system to a transmission line, the driver comprising:

an output node for connection to the transmission line;

a first field-effect transistor (FET) coupled between the output node and ground for conducting current from the output node to ground;

a main charging stage for providing a main charging current to the gate of the first FET for a period of time not to exceed a main charging time period;

a discharging stage for providing a discharge current from the gate of the first FET to ground; and a temperature compensation circuit coupled to the main charging stage and the discharging stage for adjusting the level of the main charging current and the level of the discharging current to compensate for variations in temperature and for controlling the length of the main charging time period;

wherein the main charging stage includes:

a second FET for conducting the main charging current; and main stage pulse generation circuitry for providing a main pulse to the gate of the second FET, the main pulse having a length approximately equal to the main charging time period;

wherein the main stage pulse generation circuitry includes:

a first CMOS inverter having an input, an output, and a propagation delay that can be adjusted by the temperature compensation circuit, the first CMOS inverter including a first p-channel transistor connected in series with a first n-channel transistor, the gates of the first p-channel transistor and the first n-channel transistor being coupled together to form the input for the first CMOS inverter; and a NAND gate having an output coupled to the gate of the second FET, an input coupled to the output of the first CMOS inverter, and another input coupled to a driver input node for receiving data from the data system.

11. A driver according to claim 10, wherein the temperature compensation circuit comprises:

a third FET connected in series with the first p-channel transistor and the first n-channel transistor of the first CMOS inverter; and a positive temperature coefficient current generation circuit for adjusting the gate voltage of the third FET to control the length of the main charging time period and to compensate for variations in temperature.

12. A driver according to claim 11, wherein the positive temperature coefficient current generation circuit comprises:

a fourth field-effect transistor (FET);

a fifth FET having a larger current conducting channel than the current conducting channel of the fourth FET, the fifth FET having its gate coupled to the gate of the fourth FET;

a first resistor coupled between a first node that is common with the source of the fourth FET and a second node that is common with the source of the fifth FET; and current generating circuitry for generating and maintaining substantially equal drain currents in the fourth and fifth FETs.

13. A driver according to claim 11, wherein the temperature compensation circuit further comprises:

a programmable current transfer and modification stage for selectively programming the gate voltage of the third FET to control the length of the main charging time period.

14. A driver for providing binary signals from a data system to a transmission line, the driver comprising:

an output node for connection to the transmission line;

a first field-effect transistor (FET) coupled between the output node and ground for conducting current from the output node to ground;

an initial charging stage for providing an initial charging current to the gate of the first FET for a period of time not to exceed an initial charging time period, the initial charging time period having a length approximately equal to a period of time necessary to increase the gate voltage of the first FET from ground to the threshold voltage of the first FET;

a main charging stage for providing a main charging current to the gate of the first FET; and a discharging stage for providing a discharging current from the gate of the first FET to ground.

15. A driver according to claim 14, wherein the initial charging stage comprises:

second and third FETs connected in series between a first voltage supply and the gate of the first FET; and initial stage switching circuitry for switching the second and third FETs into simultaneous conducting states for the initial charging time period.

16. A driver according to claim 15, wherein the initial charging time period is approximately equal to one logic gate delay time period.

17. A driver according to claim 15, wherein the initial stage switching circuitry comprises:

first and second inverters connected in series between a driver input node for connection to the data system and the gate of the second FET; and a third inverter connected between the driver input node and the gate of the third FET.

18. A driver according to claim 15, further comprising:

a temperature compensation circuit coupled to the initial charging stage, the main charging stage, and the discharging stage for adjusting the level of the initial charging current, the main charging current and the discharging current to compensate for variations in temperature.

19. A driver according to claim 18, wherein the temperature compensation circuit comprises:

a fourth FET connected in series with the second and third FETs of the initial charging stage; and a positive temperature coefficient current generation circuit for adjusting the gate voltage of the fourth FET to compensate for variations in temperature.

20. A driver according to claim 19, wherein the positive temperature coefficient current generation circuit comprises:

a fifth field-effect transistor (FET);

a sixth FET having a larger current conducting channel than the current conducting channel of the fifth FET, the sixth FET having its gate coupled to the gate of the fifth FET;

a first resistor coupled between a first node that is common with the source of the fifth FET and a second node that is common with the source of the sixth FET; and current generating circuitry for generating and maintaining substantially equal drain currents in the fifth and sixth FETs.

21. A driver for providing binary signals from a data system to a transmission line, the driver comprising:

an output node for connection to the transmission line;

a first field-effect transistor (FET) coupled between the output node and ground for conducting current from the output node to ground;

an initial charging stage for providing an initial charging current to the gate of the first FET for a period of time not to exceed an initial charging time period, the initial charging time period having a length approximately equal to a period of time necessary to increase the gate voltage of the first FET from ground to the threshold voltage of the first FET;

a main charging stage for providing a main charging current to the gate of the first FET for a period of time not to exceed a main charging time period;

a discharging stage for providing a discharging current from the gate of the first FET to ground; and a temperature compensation circuit coupled to the initial charging stage, the main charging stage, and the discharging stage for adjusting the level of the initial charging current, the main charging current, and the discharging current to compensate for variations in temperature and for controlling the length of the main charging time period.

22. A driver according to claim 21, wherein the main charging stage comprises:

a second FET for conducting the main charging current; and main stage pulse generation circuitry for providing a main pulse to the gate of the second FET, the main pulse having a length approximately equal to the main charging time period.

23. A driver according to claim 22, wherein the temperature compensation circuit comprises:

a programmable current transfer and modification stage for selectively programming the length of the main pulse to control the length of the main charging time period.

24. A driver according to claim 21, wherein the initial charging stage comprises:

third, fourth, and fifth FETs connected in series between a first voltage supply and the gate of the first FET, the gate voltage of the fourth FET being controlled by the temperature compensation circuit; and initial stage switching circuitry for switching the third and fifth FETs into simultaneous conducting states for the initial charging time period.

* * * * *